(12) United States Patent
Okita et al.

(10) Patent No.: US 7,937,078 B2
(45) Date of Patent: *May 3, 2011

(54) WIRELESS COMMUNICATION APPARATUS, WIRELESS COMMUNICATION NETWORK AND SOFTWARE UPGRADING METHOD

(75) Inventors: Koichi Okita, Yokohama (JP); Ryosuke Kurata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 243 days.

This patent is subject to a terminal disclaimer.

(21) Appl. No.: 12/271,071

(22) Filed: Nov. 14, 2008

(65) Prior Publication Data

US 2009/0111451 A1    Apr. 30, 2009

Related U.S. Application Data

(63) Continuation of application No. 11/798,517, filed on May 15, 2007, now Pat. No. 7,647,039, which is a continuation of application No. 11/037,283, filed on Jan. 19, 2005, now Pat. No. 7,310,519, which is a continuation-in-part of application No. 10/636,806, filed on Aug. 8, 2003, now Pat. No. 7,447,497.

(30) Foreign Application Priority Data

Apr. 21, 2003 (JP) ................................ 2003-117281
Jun. 3, 2003 (JP) ................................ 2003-157584
Sep. 6, 2004 (JP) ................................ 2004-258554

(51) Int. Cl.
| | |
|---|---|
| *H04M 3/00* | (2006.01) |
| *H04W 36/00* | (2009.01) |
| *H04B 7/00* | (2006.01) |
| *H04M 1/00* | (2006.01) |
| *H04B 1/38* | (2006.01) |

(52) U.S. Cl. ........ 455/418; 455/419; 455/436; 455/522; 455/525; 455/561

(58) Field of Classification Search .................. 455/561, 455/562.1, 103, 132, 418, 522, 423, 436, 455/438, 439, 450, 453, 456.6, 524, 525; 370/329, 330, 331, 322, 341; 709/220, 224
See application file for complete search history.

(56) References Cited

U.S. PATENT DOCUMENTS 5,345,448 A    9/1994 Keskitalo
(Continued)

FOREIGN PATENT DOCUMENTS

JP    7319683    12/1995
(Continued)

OTHER PUBLICATIONS

3 GPP TR 25.832 V4.0.0 (Mar. 2001), $3^{RD}$ Generation Partnership Project; Technical Specification Group Radio Access Network; Manifestations of Handover and SRNS Relocation (Release 4), pp. 3-13.

*Primary Examiner* — George Eng
*Assistant Examiner* — Wesley L Kim
(74) *Attorney, Agent, or Firm* — Brundidge & Stanger, P.C.

(57) ABSTRACT

A base station control portion selects one or multiple signals in accordance with the state of radio waves from signals received through multiple communication paths. A wireless communication apparatus communicates with a wireless terminal and a wired communication network at multiple frequencies. In response to a request for software upgrading from a network management device, the wireless communication apparatus selects one frequency, controls the state of transmission waves of a wireless interface such that a communication path in which a communication service is being provided can be switched to another communication network without interruption, rewrites software for each wireless interface to software received through a wired interface in advance, and returns the state of transmission waves of the wireless interface. Thus, the software can be upgraded without blackouts of the communication service to the wireless terminal.

2 Claims, 35 Drawing Sheets

U.S. PATENT DOCUMENTS

| | | |
|---|---|---|
| 5,526,357 A | 6/1996 | Jandrell |
| 5,553,137 A | 9/1996 | Nyhart et al. ............ 379/406.06 |
| 5,752,161 A | 5/1998 | Jantti et al. ..................... 455/8 |
| 6,147,983 A * | 11/2000 | Backstrom ................... 370/330 |
| 6,289,511 B1 * | 9/2001 | Hubinette ..................... 717/173 |
| 6,324,411 B1 | 11/2001 | Genell ........................... 455/561 |
| 6,411,825 B1 * | 6/2002 | Csapo et al. ................... 455/561 |
| 6,470,188 B1 | 10/2002 | Ohtani et al. |
| 6,535,740 B1 | 3/2003 | Kosugi |
| 6,845,238 B1 | 1/2005 | Muller |
| 6,847,826 B1 | 1/2005 | Wesby et al. |
| 6,978,145 B2 | 12/2005 | Takaba et al. |
| 7,190,952 B2 | 3/2007 | Okita et al. |
| 7,194,258 B2 | 3/2007 | Okita et al. |
| 7,310,519 B2 | 12/2007 | Okita et al. |
| 7,447,497 B2 | 11/2008 | Okita et al. |
| 2002/0075824 A1 | 6/2002 | Willekes et al. ............... 370/329 |
| 2002/0087668 A1 | 7/2002 | San Martin et al. |
| 2004/0203810 A1* | 10/2004 | Virtanen et al. ............... 455/450 |
| 2004/0235525 A1 | 11/2004 | Chater-Lea |

FOREIGN PATENT DOCUMENTS

| | | |
|---|---|---|
| JP | 1063498 | 3/1998 |
| JP | 10079692 | 3/1998 |
| JP | 10320210 | 12/1998 |
| JP | 2980201 | 9/1999 |
| JP | 2000151501 | 5/2000 |
| JP | 2000324043 | 11/2000 |
| JP | 200156756 | 2/2001 |
| JP | 2001056759 | 2/2001 |
| JP | 2002057792 | 2/2002 |
| JP | 2002252586 | 9/2002 |
| JP | 2003509982 | 3/2003 |
| JP | 2005010821 | 1/2005 |
| JP | 2005057806 | 3/2005 |
| JP | 2005136811 | 5/2005 |
| JP | 200674683 | 3/2006 |
| JP | 200116227 | 1/2009 |
| KR | 19990080904 | 11/1999 |

* cited by examiner

| BASE STATION NUMBER | NUMBER OF CALLS | NEIGHBOR BASE STATION NUMBER | GROUP |
|---|---|---|---|
| 1 | 5 | 2, 3, 4, 5, 6, 7 | 0 |
| 2 | 9 | 1, 3, 7, 8, ••• | 0 |
| 3 | 28 | 1, 2, 4, 8, ••• | 0 |
| 4 | 8 | 1, 3, 5, ••• | 0 |
| 5 | 12 | 1, 4, 6, ••• | 0 |
| 6 | 18 | 1, 5, 7, ••• | 0 |
| 7 | 20 | 1, 2, 6, ••• | 0 |
| 8 | 11 | 2, 3, ••• | 0 |
| ••• | ••• | ••• | ••• |
| 21 | 6 | 22, ••• | 0 |
| 22 | 19 | 21, ••• | 0 |
| ••• | ••• | ••• | ••• |

*FIG. 8*

| BASE STATION NUMBER | NUMBER OF CALLS | NEIGHBOR BASE STATION NUMBER | GROUP |
|---|---|---|---|
| 1 | 5 | 2, 3, 4, 5, 6, 7 | 1 |
| 2 | 9 | 1, 3, 7, 8, ••• | X |
| 3 | 28 | 1, 2, 4, 8, ••• | X |
| 4 | 8 | 1, 3, 5, ••• | X |
| 5 | 12 | 1, 4, 6, ••• | X |
| 6 | 18 | 1, 5, 7, ••• | X |
| 7 | 20 | 1, 2, 6, ••• | X |
| 8 | 11 | 2, 3, ••• | 0 |
| ••• | ••• | ••• | ••• |
| 21 | 6 | 22, ••• | 0 |
| 22 | 19 | 21, ••• | 0 |
| ••• | ••• | ••• | ••• |

*FIG. 9*

| BASE STATION NUMBER | NUMBER OF CALLS | NEIGHBOR BASE STATION NUMBER | GROUP |
|---|---|---|---|
| 1 | 5 | 2, 3, 4, 5, 6, 7 | 1 |
| 2 | 9 | 1, 3, 7, 8, ••• | X |
| 3 | 28 | 1, 2, 4, 8, ••• | X |
| 4 | 8 | 1, 3, 5, ••• | X |
| 5 | 12 | 1, 4, 6, ••• | X |
| 6 | 18 | 1, 5, 7, ••• | X |
| 7 | 20 | 1, 2, 6, ••• | X |
| 8 | 11 | 2, 3, ••• | 1 |
| ••• | ••• | ••• | ••• |
| 21 | 6 | 22, ••• | 1 |
| 22 | 19 | 21, ••• | X |
| ••• | ••• | ••• | ••• |

*FIG. 10*

| BASE STATION NUMBER | NUMBER OF CALLS | NEIGHBOR BASE STATION NUMBER | GROUP |
|---|---|---|---|
| 1 | 9 | 2, 3, 4, 5, 6, 7 | 1 |
| 2 | 19 | 1, 3, 7, 8, ••• | X |
| 3 | 8 | 1, 2, 4, 8, ••• | 2 |
| 4 | 18 | 1, 3, 5, ••• | X |
| 5 | 2 | 1, 4, 6, ••• | 2 |
| 6 | 5 | 1, 5, 7, ••• | X |
| 7 | 7 | 1, 2, 6, ••• | 2 |
| 8 | 1 | 2, 3, ••• | 1 |
| ••• | ••• | ••• | ••• |
| 21 | 12 | 22, ••• | 1 |
| 22 | 6 | 21, ••• | 2 |
| ••• | ••• | ••• | ••• |

*FIG. 11*

| BASE STATION NUMBER | NUMBER OF CALLS | NEIGHBOR BASE STATION NUMBER | GROUP |
|---|---|---|---|
| 1 | 10 | 2, 3, 4, 5, 6, 7 | 1 |
| 2 | 11 | 1, 3, 7, 8, ••• | 3 |
| 3 | 5 | 1, 2, 4, 8, ••• | 2 |
| 4 | 8 | 1, 3, 5, ••• | 3 |
| 5 | 1 | 1, 4, 6, ••• | 2 |
| 6 | 3 | 1, 5, 7, ••• | 3 |
| 7 | 5 | 1, 2, 6, ••• | 2 |
| 8 | 12 | 2, 3, ••• | 1 |
| ••• | ••• | ••• | ••• |
| 21 | 2 | 22, ••• | 1 |
| 22 | 4 | 21, ••• | 2 |
| ••• | ••• | ••• | ••• |

*FIG. 12*

WIRELESS COMMUNICATION APPARATUS, WIRELESS COMMUNICATION NETWORK AND SOFTWARE UPGRADING METHOD

CROSS-REFERENCES TO RELATED APPLICATIONS

The present application is a continuation of application Ser. No. 11/798,517, filed May 15, 2007, now U.S. Pat. No. 7,647,039; which is a continuation of application Ser. No. 11/037,283, filed Jan. 19, 2005, now U.S. Pat. No. 7,310,519; which is a continuation-in-part application of U.S. application Ser. No. 10/636,806, filed Aug. 8, 2003, now U.S. Pat. No. 7,447,497, the subject matter of which is incorporated by reference herein. Applicants hereby claim the right of priority based on Japanese Patent Application No. 2004-258554, filed in Japan on Sep. 6, 2004 and in Japanese Patent Application Nos. 2003-117281, filed in Japan on Apr. 21, 2003 and 2003-157584, filed in Japan on Jun. 3, 2003, the subject matter of which is also incorporated by reference herein.

BACKGROUND OF THE INVENTION

The present invention relates to a wireless communication apparatus, a wireless communication network and a software upgrading method and, in particular, to a wireless communication apparatus, a wireless communication network and a software upgrading method for upgrading software without the blackouts of communication services.

Wireless communication networks including wireless terminals and wireless communication apparatus have been introduced rapidly in addition to conventional wired communication networks. In the fields of wireless communication networks, Time Division Multiple Access (TDMA) communication networks for multiplying voice signals, for example, in a time division manner for communication have been adopted, and Code Division Multiple Access (CDMA) communication networks for code-multiplying voice signals, for example, with a spread code will be widely spread from now on. Thus, communications with any one can be performed any time and anywhere. These kinds of communication networks can operate by software included in each communication apparatus within a network and provide users of wireless terminals with various kinds of communication services such as voice communication and data communication. Therefore, the software for the communication apparatus must be upgraded properly every time the contents of each of communication services provided by the communication network advances.

A wireless communication apparatus is used for a wireless communication network and is called base station. The wireless communication is an interface apparatus for a wireless terminal and a communication network. The software as described above must be upgraded as required for providing various kinds of communication services. Therefore, various software upgrading methods have been proposed (such as JP-A-10-63498 and U.S. Pat. No. 2,980,201 or JP-A-10-320210). Upgrading the software for providing communication services is required in a general communication network. Therefore, software upgrading methods (such as JP-A-7-319683 and JP-A-2001-56756) have been proposed which allows the upgrading of software during the communication system (communication network) is in use without loss of reliability of the communication network (such as JP-A-7-319683 and JP-A-2001-56756).

Conventionally, a system for mutually connecting a wireless communication network and another communication network has been known for implementing diversity and hand-over for selectively synthesizing signals excellent in conversation quality based on the signal exchanged with plural base stations (such as JP-A-2001-16227). In a CDMA communication network, a soft hand-over technology (such as "3G TR25.832 V4.0.0", issued by 3GPP, March 2001, Section 5.2.1) has been known for synthesizing signals from communications with plural base stations and selecting a communication path when a base station is changed in order to switch a communication path without blackouts.

In a general communication network, reliability is important in order to prevent a communication blackout. Therefore, a method for upgrading software set in inactive hardware has been adopted by providing hardware with redundancy as disclosed in JP-A-7-319683 and JP-A-2001-56756, for example. Thus, the software for providing communication services and for controlling operations of a communication network can be upgraded during the software is in use.

On the other hand, in a wireless communication network, communication with wireless terminals is performed within an area where radio waves from a base station can reach. The area is called cellular. A cellular of several km radius is generally used. In other words, the number of accommodatable users and covered area are much smaller than those of a conventional wired communication network (or a switched network). Therefore, in order to provide communication services widely, many base stations must be provided widely. Thus, the cost efficiency of the communication network is significantly lost by providing these many base stations with redundancy like the wired communication network facility as disclosed above. Furthermore, plural frequency bands and CDMA spread codes must be assigned. Thus, the limited resource is wasted, and the number of users is reduced, which also reduces the serviceability. Therefore, as disclosed in JP-A-10-63498 and U.S. Pat. No. 2,980,201 or JP-A-10-320210, for example, a method is generally known for selecting a base station in accordance with a proper rule and terminating a communication service in the base station for upgrading software. For example, an operator selects a base station having lower traffic in a time zone such as at midnight and upgrades software by protecting important calls and placing the base station off-line.

However, the method will impose larger loads on the operator for managing a wireless communication network in future, and the supply of economical wireless communication networks and communication services may be difficult. For example, a wireless communication network may be widely spread and the number of terminals used by users may increase. In this case, these terminals are used while moving, and the traffic of each base station always changes without blackouts. Furthermore, a communication network may be more used without recognizing time differences in a more global communication network, and the traffic may not be always reduced at midnight in Japan. Therefore, the selection of a base station having low traffic and the protection of important calls as described above may be difficult, and the loads on operators may increase. Furthermore, from users' point of view, the number of communication service blackouts (or communication disconnection) due to software upgrading may increase. Furthermore, the level of reliability and serviceability may decrease because the supply of new services delays due to the delay of the software upgrading. Therefore, a wireless communication apparatus, wireless communication network and method for operating them (software upgrading method) are desired for upgrading software of so-called on-line communication apparatus, which eliminates the blackouts of a communication service in use in a wireless communication network including wireless communication apparatus (base stations) without redundancy and which can provide the latest communication services.

SUMMARY OF THE INVENTION

In view of these issues, it is an object of the invention to provide a wireless communication apparatus, a wireless communication network and a software upgrading method, which can upgrade software in the wireless communication apparatus within the wireless communication network even while the wireless communicating network is providing various communication services. It is another object of the invention to provide a wireless communication apparatus, a wireless communication network and a software upgrading method, which can upgrade software without blackouts of communication services being provided. It is another object of the invention that these apparatus and method can be achieved with simple and economical constructions and steps. It is another object of the invention to achieve these objects even when the invention is applied to a highly-integrated and high-density apparatus.

According to the invention, in order to achieve these objects, a soft handover technology (as disclosed in "3G TR25.832 V4.0.0", issued by 3GPP, March 2001, Section 5.2.1", for example) provided for a CDMA communication network is used to provide a wireless communication apparatus and a wireless communication network and a method for operating them. More specifically, in a CDMA communication network, communication paths are switched from one terminal to plural base stations. One having good quality of communication is selected from the base stations and is used for communication actually with the other party. Thus, the state of the transmission wave of the base station in which software will be upgraded can be controlled. Then, the communication path providing communication services can be switched from the base station to another base station without blackouts such that a state where the base station no longer provides communication services can be obtained. Under this condition, the software is upgraded, and the state of the transmission wave is returned to the original state after the software upgrading. The base station selection is repeated in accordance with a predetermined rule such that software in base stations within a wireless communication network can be upgraded without the blackouts of communication services.

According to a first aspect of the invention, there is provided a wireless communication apparatus communicating between a wireless terminal and a wired communication network by using multiple wireless communication paths having different frequencies within a handover-possible wireless communication network, the wireless communication apparatus comprising:

a wired interface for communicating with the wired communication network;

a first wireless interface for communicating with the wireless terminal at a first frequency;

a first communication processing portion for performing processing for providing a communication service to the wireless terminal at the first frequency through the first wireless interface and the wired interface;

a second wireless interface for communicating with the wireless terminal at a second frequency;

a second communication processing portion for performing processing for providing a communication service to the wireless terminal at the second frequency through the second wireless interface and the wired interface; and a control portion for controlling the wireless communication apparatus, wherein the control portion:

selects one of the first and second frequencies sequentially and changes the state of transmission waves of the first and/or second wireless interfaces in accordance with the selected frequency such that a communication path in which a communication service is being provided can be switched to another communication path without instantaneous interruption;

upgrades defined software to software received through the wired interface in advance; and returns the state of transmission waves of the first and/or second wireless interfaces after the software upgrading.

According to a second aspect of the invention, there is provided a wireless communication apparatus having sectors communicating at multiple respective frequencies between a wireless terminal and a wired communication network, by using multiple wireless communication paths having different frequencies and multiple wireless communication paths in different sectors within a handover-possible wireless communication network, the wireless communication apparatus comprising:

a wired interface for communicating with the wired communication network;

multiple wireless interfaces, one for each sector, for communicating with the wireless terminal at multiple frequencies;

multiple communication processing portions, one for each frequency, connected to the wireless interfaces, respectively, for performing processing for providing a communication service to a wireless terminal at a predetermined frequency through the wireless interface and the wired interface; and a control portion for controlling the wireless communication apparatus, wherein the control portion:

(a): selects at least one of multiple frequencies sequentially and changes the state of transmission waves of the multiple wireless interfaces for the selected frequency such that a communication path can be switched to another communication path without instantaneous interruption; and upgrades software defined in the communication processing portion in accordance with the selected frequency to software received through the wired interface in advance;

returns the state of transmission waves for the selected sector after the software upgrading; and (b): selects at least one of multiple sectors sequentially and changes the state of transmission waves of the wireless interface in accordance with the selected sector such that a communication path can be switched to another communication path without instantaneous interruption; and upgrades software defined in the wireless interface in accordance with the selected sector to software received through the wired interface in advance; and returns the state of transmission waves for the selected sector after the software upgrading.

According to a third aspect of the invention, there is provided a wireless communication network which is handover-possible, the wireless communication network comprising:

a wireless communication apparatus communicating between a wireless terminal and a wired communication network by using multiple wireless communication paths having different frequencies;

a control device having a handover unit for selecting one or multiple signals in accordance with the state of radio waves from signals received through multiple definable communication paths and communicating the wireless communication apparatus; and a network management device for managing a network, wherein the network management device sends software to upgrade and an upgrade request to the wireless communication apparatus, and each of the wireless communication apparatus:

receives the software and upgrade request sent from the network management device;

selects at least one of multiple frequencies sequentially in accordance with the received upgrade request, and changes the state of transmission waves of the selected frequency such that a communication path in which a communication service is being provided can be switched by the control device to another communication path without instantaneous interruption;

upgrades defined software to the received software; and returns the state of transmission waves after the software upgrading.

According to a forth aspect of the invention, there is provided a wireless communication network which is handover-possible, the wireless communication network comprising:

a wireless communication apparatus having multiple wave signal processing portions, one for each sector, for communicating with a wireless terminal at multiple frequencies, and multiple communication processing portions, one for each frequency, connected to the wave signal processing portions, respectively, and having sectors communicating at the respective multiple frequencies between the wireless terminal and a wired communication network by using multiple wireless communication paths having different frequencies and multiple wireless communication paths having different sectors;

a control device having a handover unit selecting one or multiple signals in accordance with the state of radio waves from signals received by multiple definable communication paths and communicating with the wireless communication apparatus; and a network management device for managing the network, wherein the network management device sends software to upgrade and an upgrade request to the wireless communication apparatus, and each of the wireless communication apparatus:

receives the software and upgrade request sent from the network management device;

(a): sequentially selects at least one of multiple frequencies in accordance with the received upgrade request and changes the state of transmission waves of the multiple wave signal processing portions for the selected frequency such that a communication path in which a communication service is being provided can be switched to another communication path by the control device without instantaneous interruption;

upgrades software defined in the communication processing portions in accordance with the selected frequency to the received software; and returns the state of transmission waves for the selected frequency after the software upgrading; and (b): sequentially selects at least one of multiple sectors and changes the state of transmission waves of the wave signal processing portion in accordance with the selected sector such that a communication path in which a communication service is being provided can be switched to another communication path by the control device without instantaneous interruption;

upgrades software defined in the wave signal processing portion in accordance with the selected sector to the received software; and returns the state of transmission waves for the selected sector after the software upgrading.

According to a fifth aspect of the invention, there is provided a software upgrading method for upgrading software in a wireless communication apparatus in a handover-possible wireless communication network, the network including a wireless communication apparatus communicating between a wireless terminal and a wired communication network by using multiple wireless communication paths having different frequencies, a control device having a handover unit for selecting one or multiple signals in accordance with the state of radio waves from signals received through multiple definable communication paths and communicating with the wireless communication apparatus, and a network management device managing a network, the method comprising the steps of:

sending software to upgrade and an upgrade request to the wireless communication apparatus by the network management device;

receiving the software and upgrade request sent from the network management device by the wireless communication apparatus;

selecting at least one of multiple frequencies sequentially in accordance with the received upgrade request and changing the state of transmission waves of the selected frequency by the control device such that a communication path in which a communication service is being provided can be switched to another communication path without instantaneous interruption by the wireless communication apparatus;

upgrading defined software to the received software by the wireless communication apparatus; and returning the state of transmission waves after the software upgrading by the wireless communication apparatus.

According to a sixth aspect of the invention, there is provided a software upgrading method for upgrading software in a wireless communication apparatus in a handover-possible wireless communication network, the network including a wireless communication apparatus having multiple wave signal processing portions, one for each sector, for communicating with a wireless terminal at multiple frequencies and multiple communication processing portions, one for each frequency, connected to the wave signal processing portions, respectively, and having sectors communicating at the respective multiple frequencies between the wireless terminal and a wired communication network by using multiple wireless communication paths having different frequencies and multiple wireless communication paths having different sectors;

a control device having a handover unit selecting one or multiple signals in accordance with the state of radio waves from signals received by multiple definable communication paths and communicating with the wireless communication apparatus; and a network management device for managing the network, the method comprising the steps of:

sending software to upgrade and an upgrade request to the wireless communication apparatus by the network management device;

receiving the software and upgrade request sent from the network management device by the wireless communication apparatus;

(a): by the wireless communication apparatus, sequentially selecting at least one of multiple frequencies in accordance with the received upgrade request and changing the state of transmission waves of the multiple wave signal processing portions for the selected frequency such that a communication path in which a communication service is being provided can be switched to another communication path by the control device without instantaneous interruption;

upgrading software defined in the communication processing portions in accordance with the selected frequency to the received software; and returning the state of transmission waves for the selected frequency after software upgrading; and (b): by the wireless communication apparatus, sequentially selecting at least one of multiple sectors and changing the state of transmission waves of the wave signal processing portion in accordance with the selected sector such that a communication path in which a communication service is being provided can be switched to another communication path by the control device without instantaneous interruption;

upgrading software defined in the wave signal processing portion in accordance with the selected sector to the received software; and returning the state of transmission waves for the selected sector after the software upgrading.

According to the invention, a wireless communication apparatus, a wireless communication network and a software upgrading method can be provided which can upgrade software in the wireless communication apparatus within the wireless communicating network even while the wireless communicating network is providing various communication services. Furthermore, according to the invention, a wireless communication apparatus, a wireless communication network and a software upgrading method can be provided which can upgrade software without blackouts of communication services being provided. Furthermore, according to the invention, these apparatus and method can be achieved with simple and economical constructions and steps. Furthermore, the invention is applicable to various highly-integrated and high-density base station apparatus.

BRIEF DESCRIPTION OF THE DRAWINGS

FIG. 8 is an explanatory diagram for describing abase station selecting operation;

FIG. 9 is another explanatory diagram for describing a base station selecting operation;

FIG. 10 is another explanatory diagram for describing a base station selecting operation;

FIG. 11 is another explanatory diagram for describing a base station selecting operation;

FIG. 12 is another explanatory diagram for describing a base station selecting operation;

DESCRIPTION OF THE PREFERRED EMBODIMENTS

Constructions of a wireless communication apparatus and wireless communication network and a software upgrading method according to this embodiment will be described in detail below with reference to drawings.

[First Software Upgrading]

Figure 1:
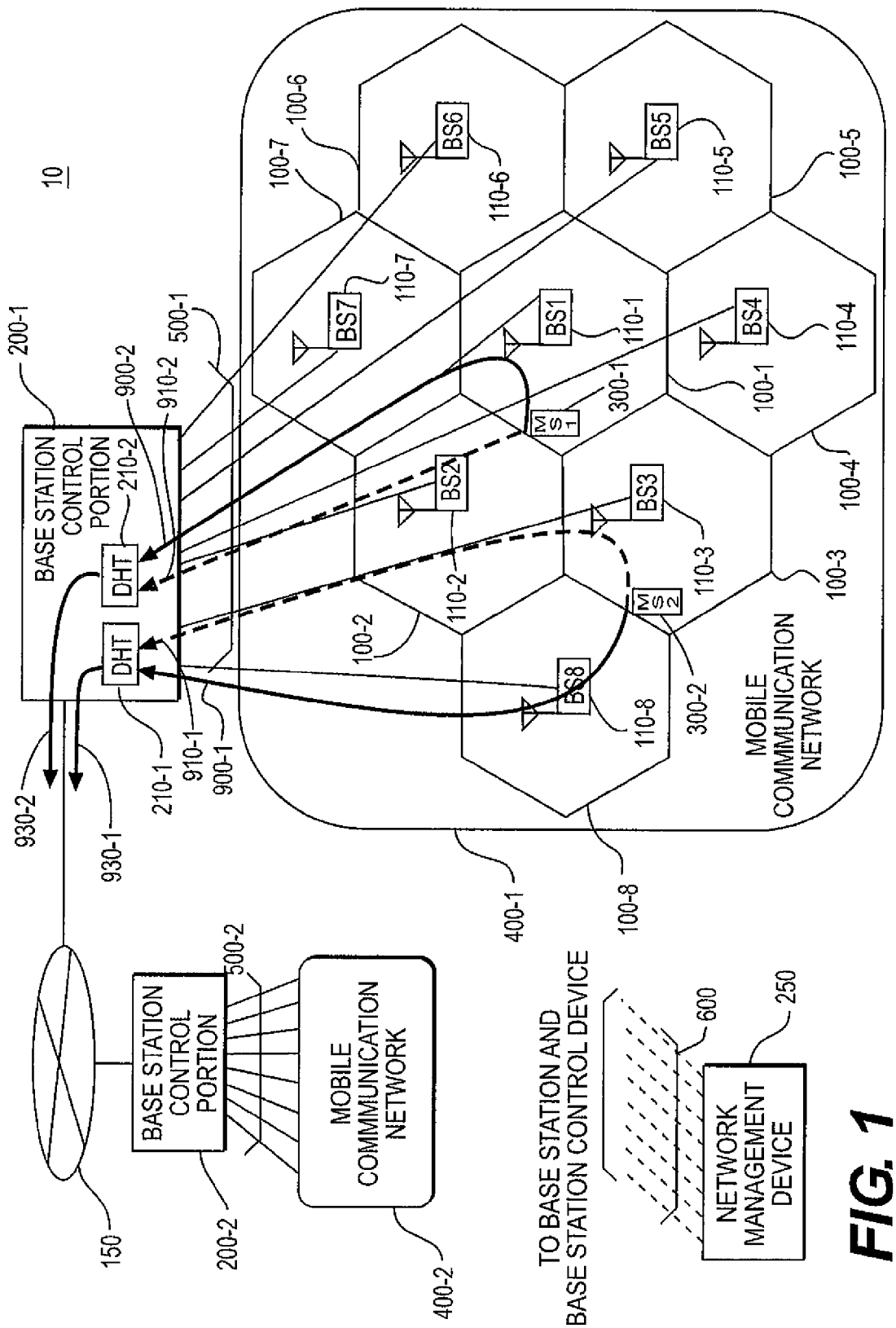
FIG. 1 is a block diagram showing a construction and operational example of a wireless communication network.

FIG. 1 is a block diagram showing a construction example of a wireless communication network according to this embodiment. A wireless communication network 10 implements communication between terminals by having a construction mentioned below.

Plural mobile terminals MS1 300-1 and MS2 300-2 and plural wireless communication apparatus (called base station hereinafter) BS1 110-1 to BS8 110-8 are connected by a wireless communication path, not shown. More specifically, each base station BS has a radio wave reachable area called cellular. Here, cellars 100-1 to 100-8 are shown. Each base station BS performs wireless communication by using a terminal MS and CDMA, for example. Though not shown, the cellars of base stations overlap with each other, and for example, communication paths 900-2 and 910-2 through plural base stations BS1 110-1 and BS2 110-2 can be set from the terminal MS1 300-1. In the description for this embodiment, an area where these plural base stations BS1 110-1 to BS8 110-8 can communication with the terminal MS is called mobile communication network 400.

The base stations BS-1 110-1 to BS8 110-8 of the mobile communication network 400-1 are connected with a base station control portion (control device) 200-1 through a main signal communication path 500-1. The base station control portion 200 includes a diversity handover unit DHT 210 for performing soft handover determined by "3GPP TR25.832 Section 5.2.1, for example, as described in detail later. The base station control portion 200 selects one communication path having good communication quality from plural communication paths 900 and 910 for communication.

When the destination of the communication from the terminal MS1 300-1 is in the same mobile communication network 400-1, the base station control portion 200-1 returns a signal 930 selected by the DHT 210 to one of the base stations BS1 110-1 to BS8 110-8 controlled by the base station control portion 200-1 and communicates with the destination terminal MS. On the other hand, when the destination is in another mobile communication network 400-2 (details of which is substantially the same as those of the mobile communication network 400-1 and will not be described herein), the base station control portion 200-1 exchanges signals 930-2 by using the base station control portion 200-2 and the mobile communication network 400-2 through a communication network 150 for connecting the base station control portions 200. Thus, the base station control portion 200-1 can communicate with the destination terminal. The communication network 150 may be any one of a public network, an exclusive line network and a private network. The mobile communication network 400-2 may be a so-called fixed network including a wired communication network and terminals fixed in the wired communication network.

The network management device 250 is connected with the base station BS 110 and the base station control portions 200 in the communication network 10 through a control signal communication path 600. The control signal communication path 600 exchanges control signals for operations administration maintenance and provisioning (OAM & P). For example, the network management device 250 manages and controls the entire facility of the communication network 10 by upgrading software in the base station 110. The number of base station BS 110, base station control portion 200 and network managing device 250 is not limited to the number shown in FIG. 1 but may be any number.

Figure 2:
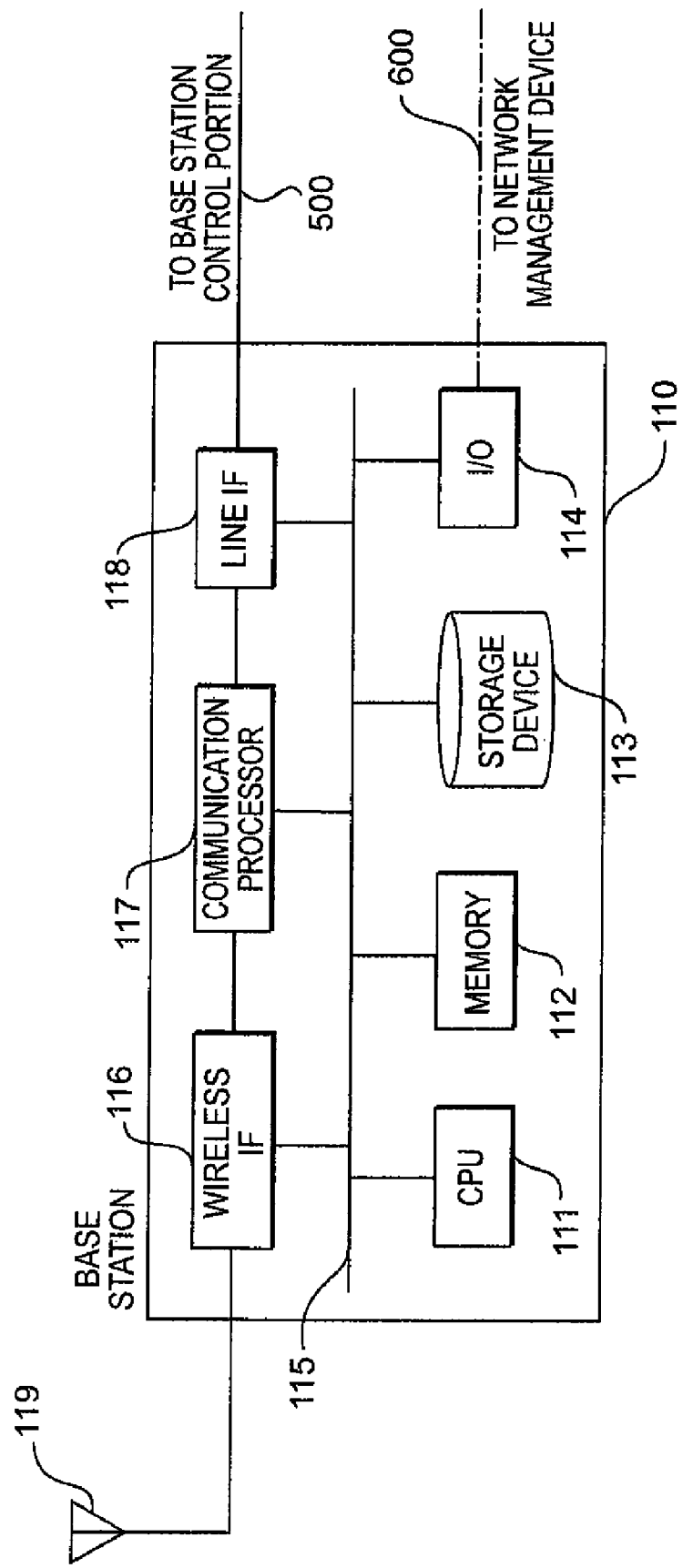
FIG. 2 is a block diagram showing a construction example of a base station.

FIG. 2 is a block diagram showing a construction example of a base station in a communication network. The base station 110 has a construction mentioned below. The base station connects between terminals and the base station control portion and communicates with the network managing device.

When the base station 110 receives, at an antenna 119, a signal (wave signal) from the terminal MS 300 through a wireless communication path, not shown, a wireless interface (IF) unit 116 performs termination processing such as the conversion of the wave signal to an electric signal. A communication processing unit 117 performs processing (such as communication processing for call controls) on the signal after the termination processing in order to perform various communication services. A line interface (IF) unit 118 matches the interface with the base station control portion 200. Then, the signal is sent to the base station control portion 200 through a main signal communication path 500. The base station 110 sends the signal from the base station control portion 200 to the terminal MS 300 by following steps in the opposite direction of the above-described processing.

The CPU 111 of the base station 110 controls the entire base station 110 by using a control program stored in the memory 112 and data (such as information on terminals) required for operating the wireless communication network 10. In this case, the data is stored in a storage device 113. These units are connected through an internal bus 115. An I/O 114 connected to the internal bus 115 is an interface with the network managing device 250 and exchanges, through a control signal communication path 600, a control signal (or command signal) and various kinds of data required for control of the operation and maintenance of the communication network 10. Here, the I/O 114 may be removed and the main signal communication path 500 may be used to add these control signal and data to the signals exchanged through the main signal communication path 500. Then, the resulting signals may be exchanged through a line IF unit 118.

Upon the upgrading of communication services provided in the wireless communication network 10, the CPU 111 of the base station 110 upgrades software (such as a control program) stored in the memory 112 or firmware (such as a control program) stored in the wireless IF unit 116, communication processing unit 117 and line IF unit 118 by following steps and performing operations mentioned below and by keeping the base station in use (in operation or at on-line state). The operation for upgrading software and/or firmware while the base station is being used may be called on-line upgrading hereinafter.

Figure 3:
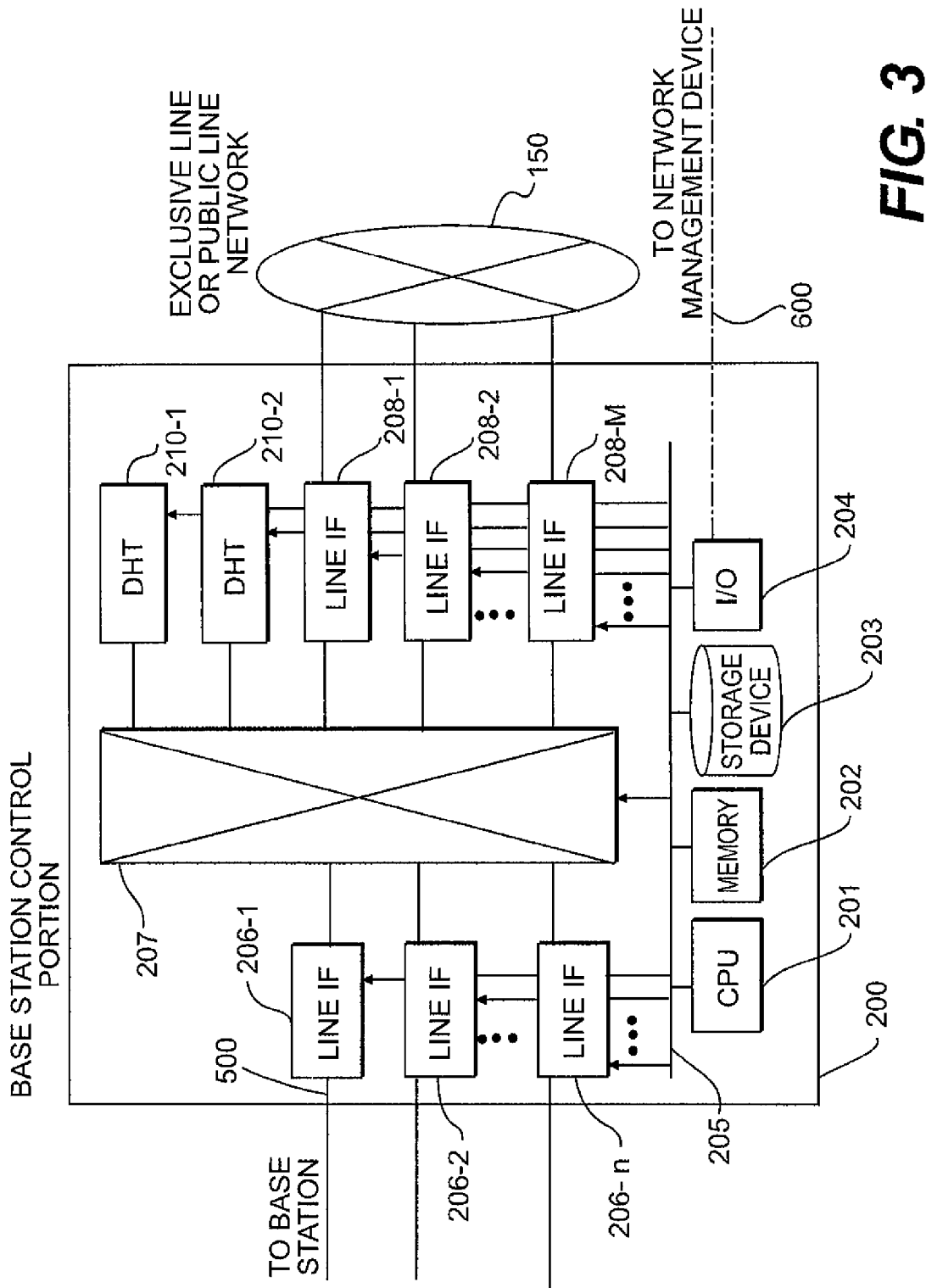
FIG. 3 is a block diagram showing a construction example of a base station control portion.

FIG. 3 is a block diagram showing a construction example of the base station control portion. The base station control portion 200 has a construction mentioned below. The base station control portion 200 connects a communication network 150 for connecting base station control portions 200 and a base station and controls the base station 110.

The base station control portion 200 implements the communication of the base stations by connecting plural line IF units 206-1 to 206-n, plural line IF units 208-1 to 208-m and plural diversity handover units DHT 210-1 and 210-2 through a switch 207. In this case, the plural line IF units 206-1 to 206-n are interfaces with the base stations 110. The plural line IF unit 208-1 to 208-m are interfaces with the communication network 150 (see FIG. 1) The plural diversity handover units DHT 210-1 and 210-2 perform soft handover processing provided by the 3GPP standard, for example (see "3G TR25.832 V4.0.0", issued by 3GPP, March 2001, Section 5.2.1, for example). The numbers of the line IF unit 208 and the DHT 210 depend on the size of the communication network and may be single.

The CPU 201 of the base station control portion 200 controls the entire base station control portions 200 and the base stations 110 connected to the base station control portions 200 by using a control program stored in the memory 202 and data (such as information on terminals and base stations) required for operations of the wireless communication network 10 and stored in the storage device 203. These units are connected through an internal bus 205.

The memory 202 or storage device 203 temporally stores programs (in software or firmware) required for the on-line upgrading in the base stations 110. The I/O 204 connected to the internal bus 205 is an interface with a network managing device 250 and exchanges, through the control signal communication path 600, control signals (such as command signals) and/or various kinds of data required for the control over the operations and maintenance of the wireless communication network 10. The I/O 204 may be removed and the main signal communication path 500, for example, may be used. In this case, these control signals and data are added to signals exchanged through the main signal control path 500 and may be exchanged through the circuit IF unit 206 or 208.

Next, the handover will be described. According to this embodiment, the base station control portion 200 implements soft handover processing provided by the 3GPP standard (see "3G TR25.832 V4.0.0", issued by 3GPP, March 2001, Section 5.2.1), for example. The specific operation will be described with reference to FIGS. 1 to 3. Here, the DHT 210 may implement diversity handover (soft handover) by using the construction and method disclosed in JP-A-2001-16227 (the DHT 210 may correspond to a DH 30 in drawings in the publication). The publication discloses a construction and method for ATM but the same construction and method can be used for non-ATM signals. Therefore, the wireless communication apparatus and wireless communication network according to the invention are not limited to those for ATM signals.

Signals from the terminal MS1 300-1 reaches the base station control portion 200 through at least two base stations. For example, in FIG. 1, a signal reaches the base station control portion 200-1 through the communication paths 900-2 and 910-2. The base station control portion 200 inputs at least two signals received at the line IF 206 to the same DHT 210-1 or 210-2 through the switch 207.

The DHT 210 selects one of the received signal from the wireless communication path having a better wave condition based on the information on the state of the wireless communication path included in the input, at least two signals. For example, the DIT 210 selects a signal from the communication path 910-2 having a better wave condition from the signals received through the communication paths 900-2 and 910-2 when the wave condition of the base station BS1 110-1 is bad. The signal selected by the DHT 210 is output to the destination through the switch 207 and the line IF 206 or 208. More specifically, when the destination is in the same mobile communication network 400, the selected signal is output to the base station 110 of the destination through the line IF 206. Otherwise, the selected signal 930-2 (FIG. 1) is output to the communication network 150 (FIG. 1) through the line IF 208. The DHT 210 may synthesize plural received signals as required.

The DHT 210 stores the selection result (the base station 110 that the selected signal comes from) in the memory 202 or storage device 203 as call information such that the information can be used as information for selecting the base station for software upgrading in the base station 110, which will be described later. Alternatively, a path through the line IF 206 or a path through the network managing apparatus 250 in the I/O 204 may be used to notify the selection result to the base stations 110 having sent the signals and/or the network managing apparatus 250. Then, the selection information may be stored as call information in the memory 112/252 or the storage device 113/253 of the base stations 110 and/or the network managing apparatus 250.

The call information stored in the memory 202 or storage device 203 may be created and be stored based on the control signal for call setting and/or disconnection actually exchanged between the base station 110 and the base station control portion 200. In this case, since the base station 110 itself can manage the call state, the selection result (call information) from the base station control portion 200 does not have to be notified to the base stations 110.

Figure 4:
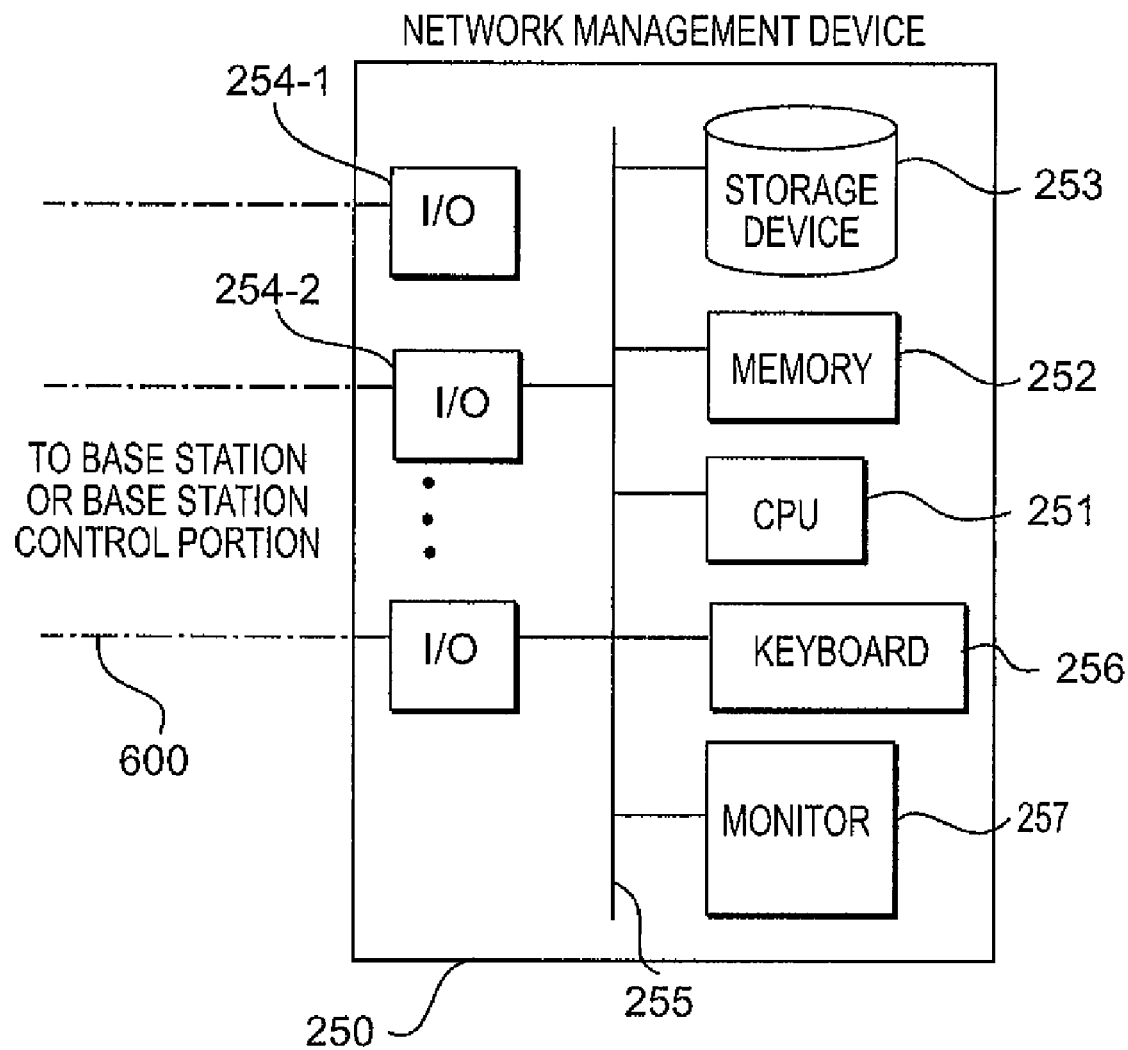
FIG. 4 is a block diagram showing a construction example of a network management device.

FIG. 4 is a block diagram showing a construction example of the network management device. The network management apparatus 250 has a construction mentioned below. The network management device 250 communicates with and controls the base stations 110 and/or the base station control portion 200 through the control signal communication path 600.

The network management device 250 manages the maintenance and operations of the entire wireless communication network 10 including plural mobile communication networks 400 each including plural base stations 110. Mode specifically, the network management device 250 includes, for example, plural I/O 254, a CPU 251, a memory 252, a storage device 253, a keyboard 256 and a monitor 257. These are connected in an internal bus 255.

The I/O 254 is a communication interface for the base stations 110 and/or base station control portion 200 in the wireless communication network 10. The CPU 251 controls the entire network managing apparatus 250 and exchanges control signals (such as command signals) and/or data through the I/O 254 and also maintains and operates the entire mobile communication network 400 including the base station 110.

The memory 252 stores operational programs, for example, of the CPU 251. The storage device 253 stores data (such as information on terminals and base stations) required for operating the wireless communication network 10 in the network management device 250 and stores software and/or firmware newly upgraded in the base stations 110. The keyboard 256 is an input unit for inputting instructions from an operator (such as a maintenance staff). The monitor 257 is a display unit for notifying the operator of the operation state of the wireless communication network 10.

After the software and/or firmware to be upgraded online are stored in the storage device 253 in accordance with the instruction from the operator, for example, the online upgrading in the base stations 110 are supported by following steps mentioned below.

Figure 5:
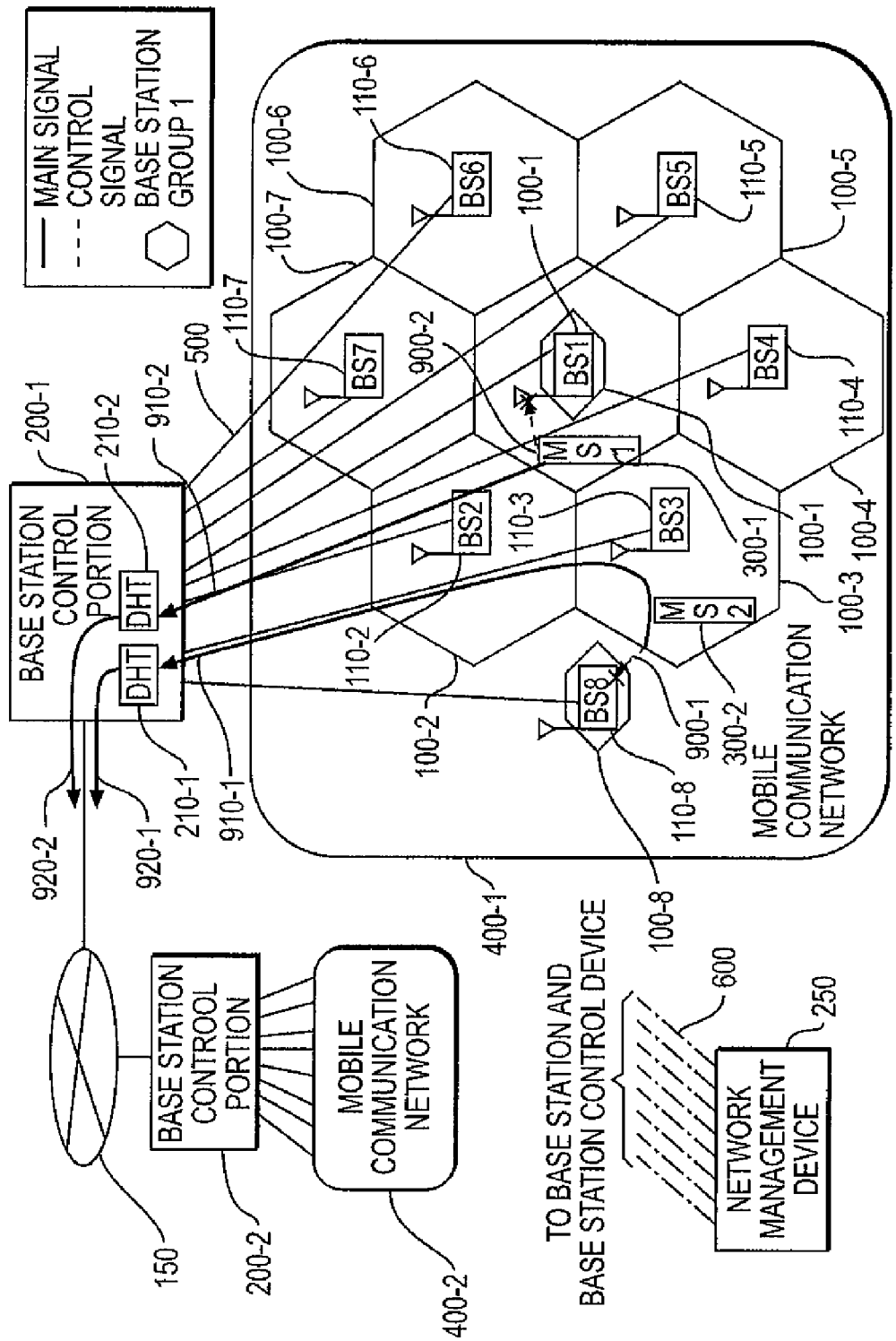
FIG. 5 is a block diagram showing a construction of a wireless communication network and an operational example where a transmission radio wave of a base station is reduced.

FIG. 5 is a block diagram showing a construction and operational example of a wireless communication network where the transmission waves of the base stations BS1 110-1 and BS8 110-8 are lower than those in FIG. 1. In FIG. 1, the cellular 100-1 of the base station BS1 110-1 overlaps with the cellars 100-2 to 100-7 of the adjacent base stations BS2 110-2 to BS7 110-7. On the other hand, in the state as shown in FIG. 5, the cellar 100-1 is reduced due to the decrease in transmission wave of the base station BS1 110-1 and does not overlap with the other cellars. Similarly, the cellular 100-8 of the base station BS8 110-8 does not overlap with the cellulars 100-2 and 100-3 of the base stations BS2 110-2 and BS3 110-3.

Thus, the terminal MS1 300-1 cannot set the communication path 900-2 with the base station BS1 110-1 and only can set the communication path with the base station BS2 110-2. The terminal MS1 300-1 selects the communication path 900-2 having better communication quality in FIG. 1. However, the communication path 900-2 cannot be set under the condition as shown in FIG. 5. Therefore, the communication path 910-2 is switched from the communication path 900-2 by the DHT 210-2 of the base station control portion 200-1. Similarly, the communication path 900-1 is switched to the communication path 910-1 for the terminal MS2. The base station control portion 200-1 communicates with the destination terminal by using the signals 920-1 and 920-2 from the switched communication path.

By controlling the transmission waves of the base stations as described above, the communication path being supplying a communication services can be switched without blackouts from a specific base station to the adjacent base station. Then, the base station no longer provides the communication service. Under this condition, software upgrading is performed, and the transmission waves are returned to the original state after the software upgrading. In this case, the base station in which the software will be upgraded is repeatedly selected in accordance with a predetermined rule, and the above-described processing is performed on the selected base station. Thus, the software upgrading in base stations in the wireless communication network can be implemented without blackouts of communication services.

Figure 6:
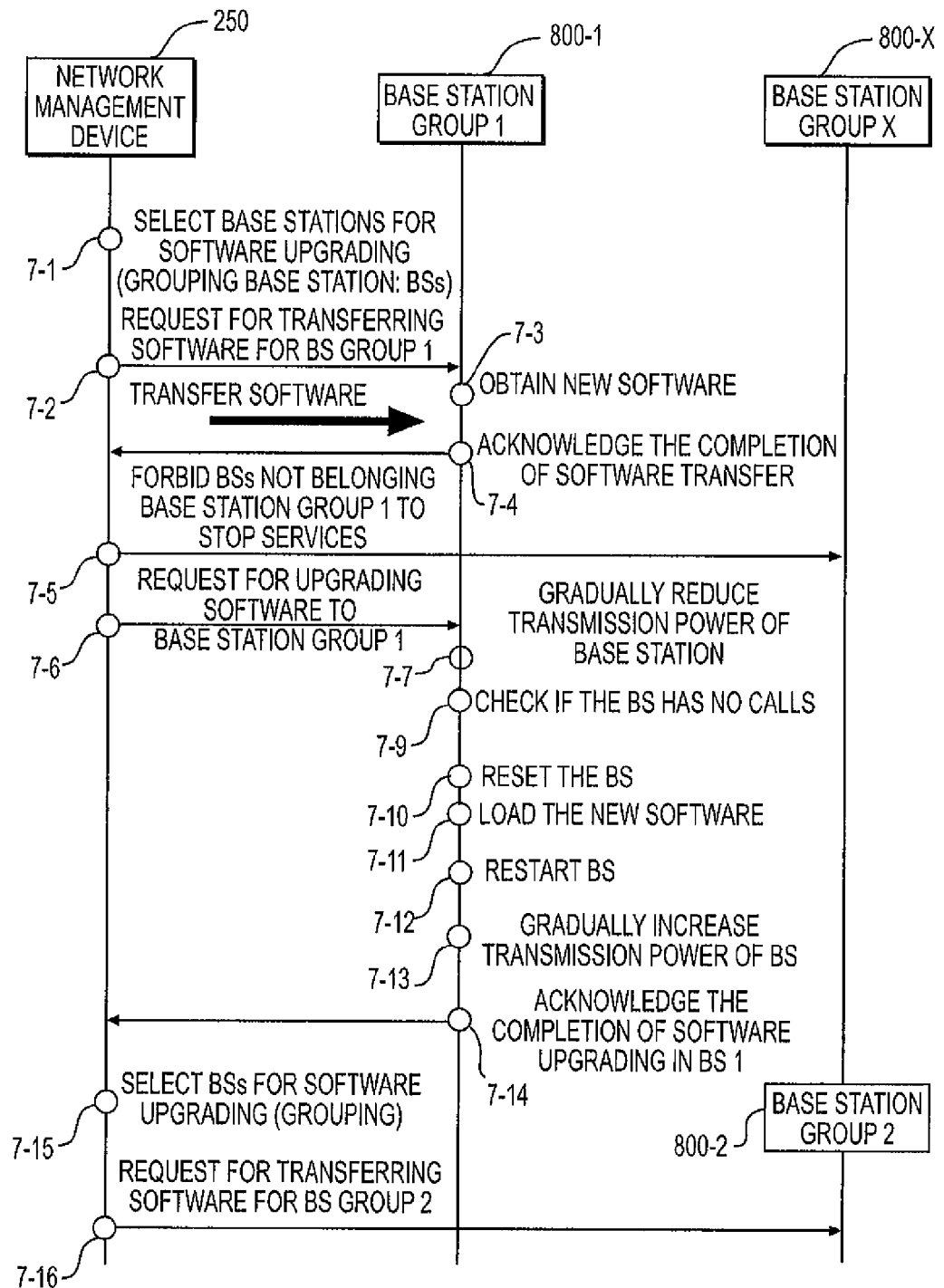
FIG. 6 is an operational explanatory diagram for describing an example of a software upgrading operation in a base station.

FIG. 6 is an operational explanatory diagram for describing an example of a software upgrading operation in a base station. First of all, in accordance with a predetermined rule, the network management device 250 selects base stations in which software will be upgraded (grouping step 7-1). A group of the base stations selected in the step 7-1 is called base station group 1 (800-1). The details of the base station selection will be described later. When the network management device 250 requests (step 7-2) for transferring software to the base station group 1, the base stations belonging to the base station group 1 (800-1) obtain (step 7-3) new software from the network management device 250 and sends acknowledgement of transferring software to the network management device 250 (step 7-4). The network management device 250 forbids (step 7-5) the base stations (800-*x*) other than those in the base station group 1 (800-1) performing a service stopping operation (step 7-5) and sends a request for software upgrading to the base station group 1 (800-1) (step 7-6). The step 7-5 may be omitted.

The base stations belonging to the base station group 1 (800-1) gradually decreases transmission power (step 7-7) when the request is received. Thus, calls connected to the base stations are handed over to the neighbor base station sequentially. The base stations belonging to the base station group 1 (800-1) checks if the base stations have no calls (no communication path providing service) (step 7-9). With reference to call information stored in the memory 112 or storage device 113 or with reference to call information managed in the base station control portion 200, the base station can check if the base stations have no calls. After determining no calls, the base stations are reset (step 7-10) and the base stations load new software (step 7-11). Thus, the base stations are restarted (step 7-12). The base stations belonging to the base station group 1 (800-1) gradually increase transmission power of the base stations (step 7-13) and acknowledge the completion of the software upgrading to the network management device 250 (step 7-14) when the transmission power reaches the original transmission power.

After the network management device 250 receives the acknowledgement of the completion of the software upgrading from all of the base stations belonging to the base station group 1 (800-1), the network management device 250 selects new base stations in which software will be upgraded (step 7-15: grouping). A group of the selected base stations is called base station group 2 (800-2). The network management device 250 requests the transfer of software to the base station group 2 (800-2) (step 7-16). The step 7-16 is the same as the step 7-2. The network management device 250 performs the same processing on the base station group 2 (800-2) as the processing at the steps 7-2 to 7-14 on the base station group 1 (800-1). These steps are repeated until all of the base stations are grouped. Thus, software upgrading can be performed in all of the base stations.

In order to switch a call communication path in service connected to the base station in which software will be upgraded to a neighbor base station, software should not be upgraded in the neighbor base station at the same time. Therefore, a predetermined rule is required for selecting a base station in which software will be upgraded.

Figure 7:
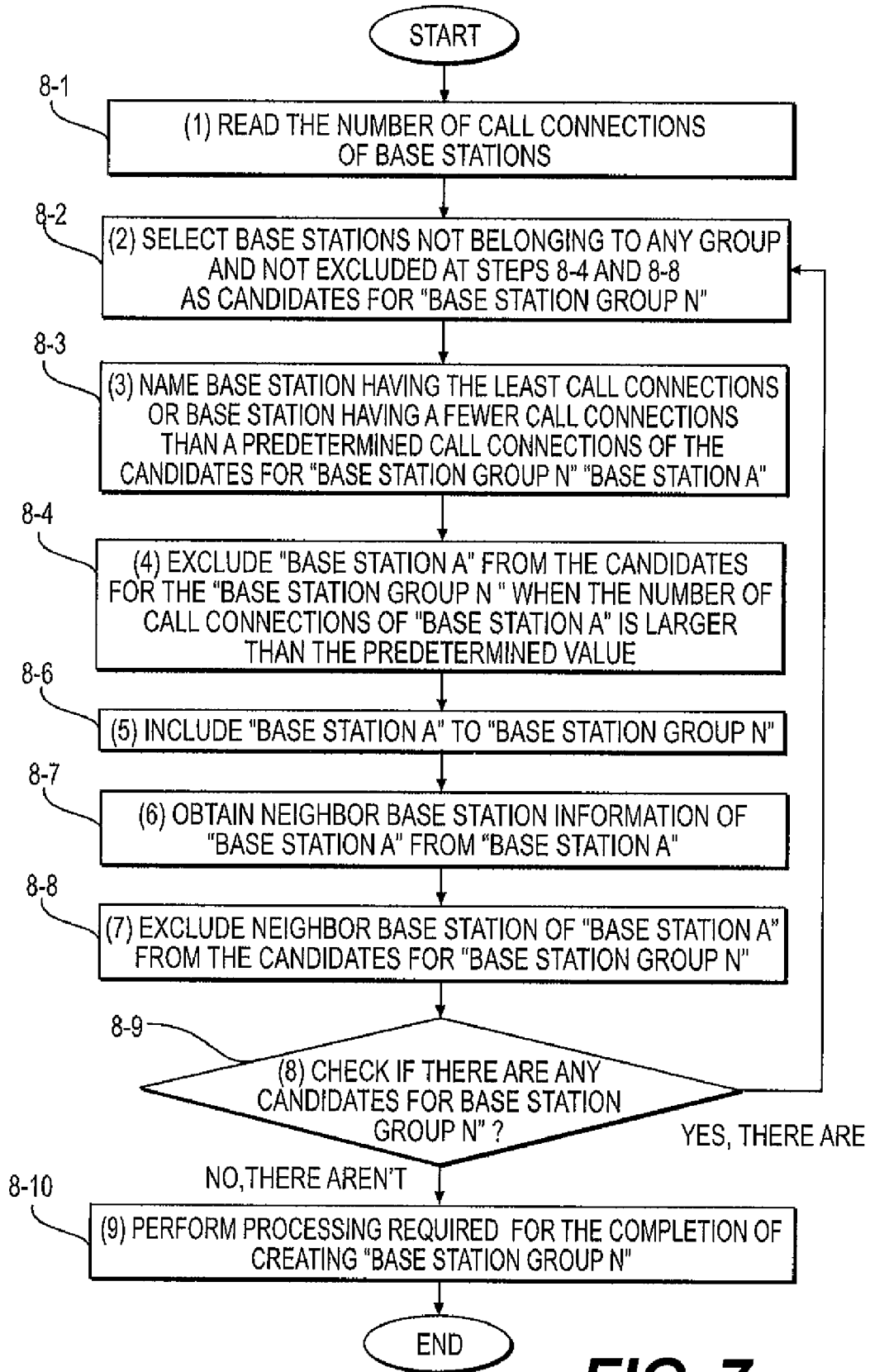
FIG. 7 is a flow diagram showing an example of an operation for selecting a base station where software will be upgraded.

FIG. 7 is an operational flow diagram showing an example of an operation in the network management device for selecting a base station in which software will be upgraded. The flow shown in FIG. 7 is a detail flow of the steps 7-1 and 7-15 in FIG. 6. Through the processing shown in FIG. 7, the network management device 250 selects and creates base station group n (where n is an integer of one or above).

First of all, the network management device 250 reads the number of call connections from the memory 252 (step 8-1). Here, the network management device 250 may read the number of call connections from the base station control portion 200 or each of the base stations 110. Next, the network management device 250 selects (step 8-2), as candidates for the base station group n, the base station which has not belonged to any groups yet and the base station which has not been excluded at steps 8-4 and 8-8. Then, the network management device 250 selects from the candidates the base station having the least number of calls or the base station having the fewer number of call connections than a predetermined number of call connections. The selected base station is named as base station A (step 8-3).

Next, if the number of call connections of the base station A is more than the predetermined value, the network management apparatus 250 excludes the selected base station from the candidates (step 8-4). On the other hand, if not, the network management device 250 add the base station A into the base station group n (step 8-6). Then, the network management device 250 obtains information on the neighbor base stations of the base station A from the memory 252 (step 8-7). The neighbor base stations of the base station A are excluded from the candidates for the base station group n (step 8-8). When the base selected base station is excluded from the candidates at the step 8-4, the steps 8-6 to 8-8 are not necessary.

After that, the network management device 250 checks if any base stations to be candidates for the base station group n remain (step 8-9). If the base stations to be the candidates still remain, the processing returns to the step 8-2. Then, the step 8-2 and subsequent steps are performed. On the other hand, no base stations to be the candidates remain, the network management device 250 ends the creation and selection of the base station group n (8-10).

By performing the above-described steps, software upgrading is not performed in the base stations adjacent to each other at the same time. Therefore, the communication path of the call in communication service in the base station in which software will be upgraded can be switched to the neighbor base station.

FIGS. 8, 9, 10, 11 and 12 are explanatory diagrams for describing states of the base station selecting operation shown in FIG. 7. The memory 252 of the network management device 250 stores a table containing base station identifiers, a number of calls connected to base stations (number of call connections), neighbor base station identifiers and group information, as shown in FIGS. 8, 9, 10, 11 and 12. By performing the processing shown in FIG. 7 with reference to the table, a base station group in which software will be simultaneously upgraded can be selected. The base station selecting operation will be described below with reference to FIGS. 8, 9, 10, 11 and 12.

FIG. 8 is a diagram showing a state before the selection of the base station group. First of all, the creation of the base station group 1 will be described. "0" in the column, "GROUP", in the figures indicates that the base station does not belong to any group, meaning that the base station can be the candidate for the selection. The network management device 250 selects a base station 1 having five call connections, which is the least number of call connections, (or base station 1 having fewer call connections than a predetermined call connections (15 call connections, in this case) and identified first) by performing steps 8-1 to 8-6 in accordance with the selecting processing in FIG. 7. Then, the network management device 250 gives "1" in the column, "GROUP".

Next, at steps 8-7 and 8-8 in FIG. 7, the number of the neighbor base station of the base station 1 is referred, and "x" is given to the column, "GROUP", for the neighbor base station of the base station 1. Here, "x" indicates that the base station is excluded from the candidates for the selection.

FIG. 9 shows the state at that time.

Furthermore, at a step 8-9 in FIG. 7, the network management device 250 performs again the operation for selecting base stations at the step 8-2 and subsequent steps since the base stations which can be the candidates still remain.

The network management device 250 selects a base station 21 having six call connections, which is the least number of call connections, (or base station 21 having fewer call connections than the predetermined call connections (15 call connections, in this case) and identified first) from the base stations having "0" in the column, "GROUP", (or other than the base stations having "1" and "x") (step 8-2 to 8-4). Then, the network management device 250 gives "1" in the column, "GROUP" (step 8-6) and refers to the neighbor base station 22 of the base station 21 (step 8-7). Then, the network management device 250 gives "x" to the column, "GROUP", of the base station 22 (step 8-8).

Furthermore, by performing a step 8-9 and the step 8-2 and subsequent steps, the network management device 250 selects a base station 8 having eleven call connections, which is the least number of call connections, (or base station 8 having fewer call connections than the predetermined call connections (15 call connections, for example) and identified first) from the base stations having "0" in the column, "GROUP", (or other than the base stations having "1" and "x"). Then, the network management device 250 gives "1" in the column, "GROUP", thereof. By performing this processing until the base stations not having "1" or "x" in the column, "GROUP" no longer exist. Thus, the base station group 1 can be created and be selected. (After this, the processing goes to a step 8-10.)

FIG. 10 is a diagram where the election of the base station group 1 ends. The network management device 250 performs processing for software upgrading on the base stations having "1" in the column, "GROUP". After the completion of the software upgrading of the base station group 1, the network management device 250 changes "x" in the column "GROUP" to "0", for example, which is data indicating that the upgrading has been performed or indicating that the base station is a candidate for the selection. Then, the network management device 250 selects the base station group 2 in the same manner as the one described above. In this example, "0" stored in the column, GROUP" indicates that software has not been upgraded while a group number such as "1" indicates that the software has been upgraded.

FIG. 11 is a diagram where the selection for the base station group 2 has completed. Also in FIG. 11, the network management device 250 selects base stations in the same manner as the selection for the base station group 1 in FIG. 10 and gives "2" or "x" in the column, "GROUP". In the case shown in FIG. 11, the base stations 5, 22, 7 and 3 are sequentially selected for the group 2 in accordance with the selection operation shown in FIG. 7 (where the base station having the least call connections is selected).

The number of calls connecting to base stations are different between FIG. 10 and FIG. 11. This means that the call movement changes the number connecting calls because since there is a difference in time between the software upgrading for the base station group 1 and the software upgrading for the base station group 2. According to this embodiment, in order to prevent the change in the number of call connection to be referred during the selection of a base station group, the number of call connections is read during the selection processing, and the selection processing is performed with reference to the read number of call connections. The number of call connections to be referred is not limited to the read number of call connections, and the selection processing may be performed with reference to the changing number of call connections.

FIG. 12 is a diagram where the selection of a base station group 3 has been completed. Also in FIG. 12, the network management device 250 selects base stations and gives the group number "3" or "x" thereto in the same manner as the selection of the base station groups 1 and 2 in FIGS. 10 and 11. In the case in FIG. 12, base stations 6, 4 and 2 are sequentially selected for the base station group 3 in accordance with the selection operation shown in FIG. 7 (where the base station having the least number of connections is selected). As shown in FIG. 12, when no base stations having "x" exist when the group selection completes, the group number is given to all base stations. This means that the creation of the base station group has completed.

Figure 13:
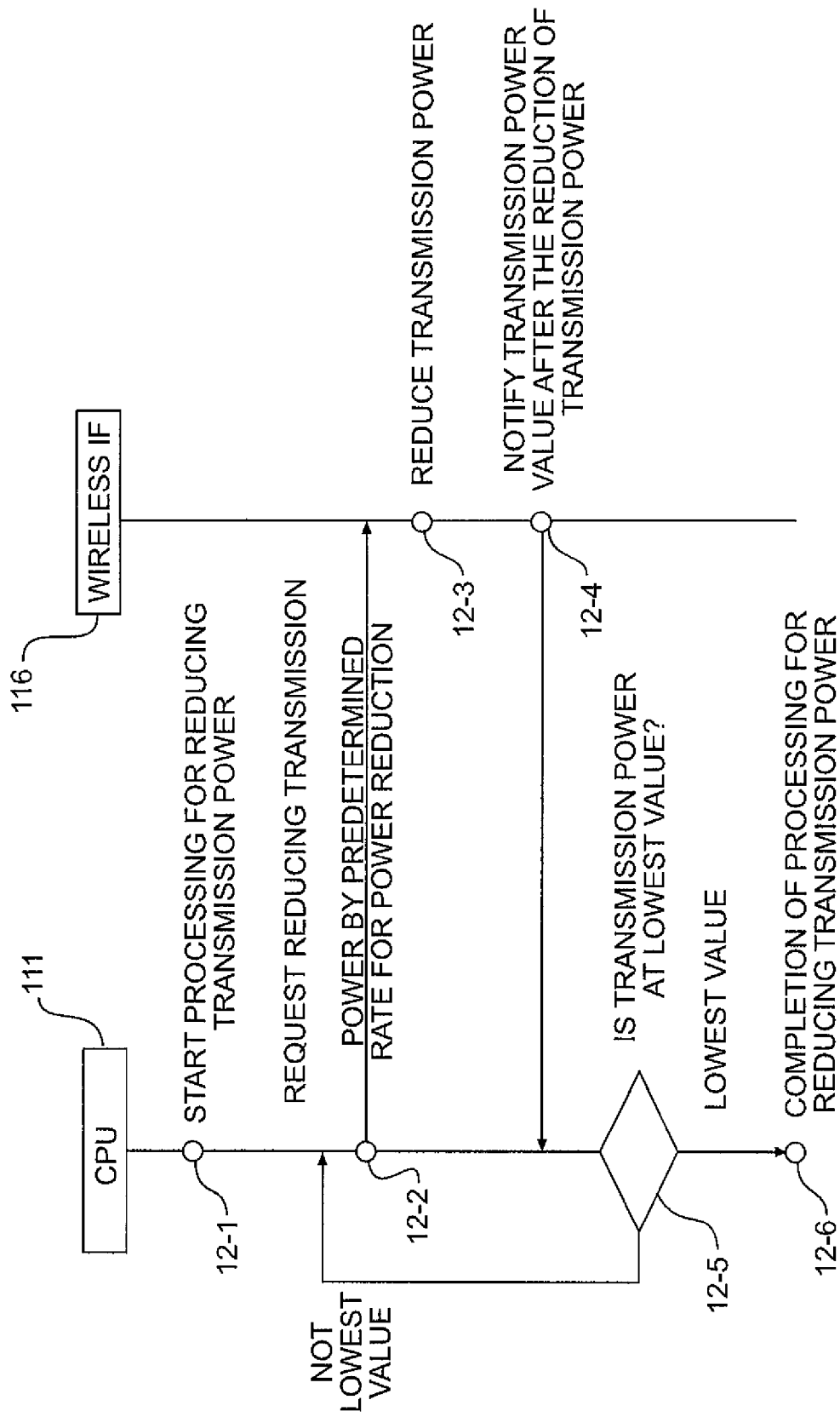
FIG. 13 is an operational explanatory diagram showing an operational example of a base station for upgrading software.

FIG. 13 is an operational explanatory diagram showing an operational example of transmission power reducing processing in a base station where software will be upgraded. The operational example in FIG. 13 is detail processing of the step 7-7 shown in FIG. 6. In the base station 110 where software will be upgraded, the CPU 111 starts reducing transmission power (step 12-1) in response to a software upgrading request from the network management device 250. The CPU 111 requests the wireless IF 116 to reduce transmission power by a predetermined amount of the power reduction rate (step 12-2). The wireless IF 116 reduces the transmission power in response to the request (step 12-3) and notifies the CPU 111 of the transmission power value after the transmission power reduction (step 12-4). The CPU 111 checks if the power value notified from the wireless IF 116 is the lowest value of the predetermined transmission power or not (step 12-5). If not, the processing returns to the step 12-2, and the step 12-2 and subsequent steps are performed again. On the other hand, if the notified power value reaches the lowest value, the CPU 111 ends the transmission power reduction (step 12-6).

Through these steps, the base station 110 can gradually reduce the transmission power of the base station 110 and switch the communication path that the base station 110 is providing a communication service to the neighbor base station. Thus, the state that the base station 110 no longer provides the communication service can be obtained.

[Second Software Upgrading]

Next, another wireless communication network according to this embodiment will be described below.

Figure 14:
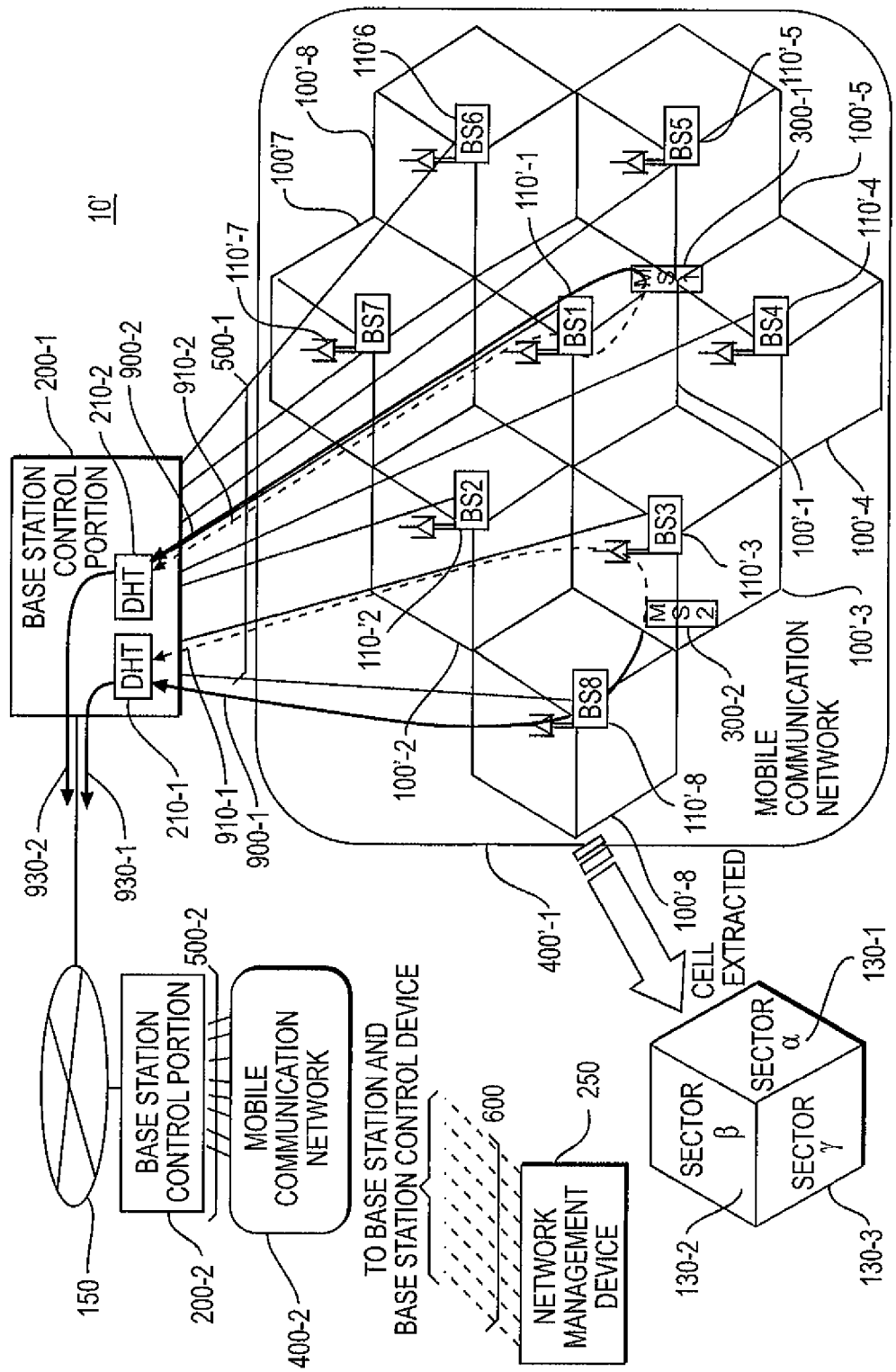
FIG. 14 is a block diagram showing a construction and operational example of a wireless communication network in which one base station has plural sectors.

FIG. 14 is a block diagram showing a construction example of a wireless communication network according to this embodiment. A wireless communication network 10' has a construction described below and implements communication among terminals.

Plural mobile terminals MS1 300-1 and MS2 300-2 and plural wireless communication apparatus (called base station hereinafter) BS1 110'-1 to BS8 110'-8 are connected by a wireless communication path, not shown. More specifically, each base station BS communicates with a terminal MS by using a CDMA in an area (called sector) that radio waves can reach. In the example in FIG. 14, a sector .alpha. 130-1, a sector .beta. 130-2 and a sector .gamma. 130-3 are shown. However, each base station can have any number of sectors. Though not shown, the sectors of each actual base station overlap and the sector .alpha. 130-1 and a sector .gamma. 130-3 of the base station BS1 can be set through communication paths 900-2 and 910-2 from the terminal MS1 300-1. In the following description for this embodiment, an area where the plural base stations BS1 110'-1 to BS2 100'-8 can communicate with a terminal MS is called mobile communication network 400'.

The base stations BS1 110'-1 to BS8 110'-8 of a mobile communication network 400'-1 are connected by a base station control portion (control device) 200-1 and a main signal communication path 500-1. The base station control portion 200 includes a diversity handover unit (DHT) 210 (which will be described in detail later) for performing soft handover provided in "3GPP TR25.832, Section 5.2.1", for example. The base station control portion 200 selects and communicates with one communication path having good communication quality from the plural communication paths 900 and 910.

When the destination from the terminal MS1 300-1 is in the same mobile communication network 400'-1, the base station control portion 200-1 returns a signal 930 selected by the DHT 210 to one of the base stations BS1 110'-1 to BS8 110'-8 controlled by the base station control portion 200-1 and communicates with the destination terminal MS. On the other hand, the destination is a terminal of another mobile communication network 400'-2 (the detail construction of which is substantially the same as that of the mobile communication network 400'-1 and will be omitted here), the base station control portion 200-1 exchanges signals with the destination terminal through the communication network 150 connecting between base station control portions 200 by using a base station control portion 200-2 and a mobile communication network 400'-2. The communication network 150 may be a public network, an exclusive line network and a private network. The mobile communication network 400'-2 may be a so-called fixed network including a wired communication network and terminals fixed in the wired communication network.

The network management device 250 is connected with the base station BS 110' and the base station control portions 200 in the communication network 10' through a control signal communication path 600. The control signal communication path 600 exchanges control signals for monitoring and maintenance. For example, the network management device 250 manages and controls the entire facility of the communication network 10' by upgrading software in the base station 110'. The number of sectors within the base station BS 110', base station control portion 200, network managing device 250, and each base station BS is not limited to the number shown in FIG. 14 but may be any number.

Figure 15:
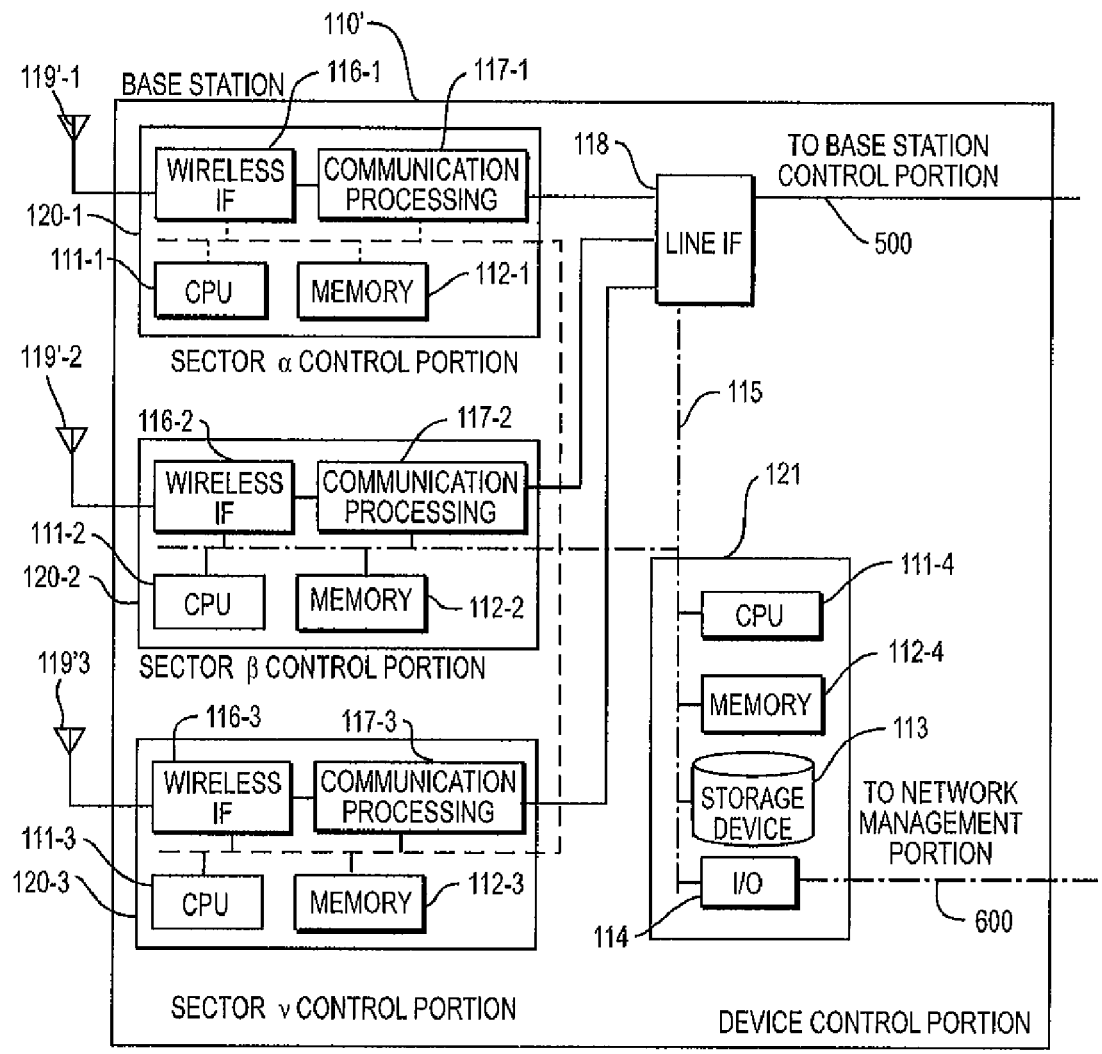
FIG. 15 is a block diagram showing a construction example of a base station having plural sectors.

FIG. 15 is a block diagram showing a construction example of a base station in a communication network. The base station 110' has a construction mentioned below. The base station connects between terminals and the base station control portion and communicates with the network managing device.

When the base station 110' receives, at an antenna 119'-1, a signal (wave signal) from the terminal MS 300 through a wireless communication path, not shown, a wireless IF unit 116-1 performs termination processing such as the conversion of the wave signal to an electric signal. A communication processing unit 117-1 performs processing (such as communication processing for call controls) on the signal after the termination processing in order to perform various communication services. A line IF unit 118 matches the interface with the base station control portion 200. Then, the signal is sent to the base station control portion 200 through a main signal communication path 500. The base station 110' sends the signal from the base station control portion 200 to the terminal MS 300 by following steps in the opposite direction of the above-described processing. This is a case where the sector .alpha. control portion 120-1 exchanges signals (wave signals). However, the exchanges of signals (wave signals) by the sector .beta. control portion 120-2 and sector .gamma. control portion 120-3 can be performed in the same manner.

The CPU 111-4 of an apparatus management portion 121 of the base station 110' uses a control program stored in the memory 112-4 and data (such as information on terminals) required for operating the wireless communication network 10'. In this case, the data is stored in a storage device 113. Thus, the CPU 111-4 controls the entire base station 110' such as the sector control portions 120-1 to 120-3 and the line IF 118.

The CPU 111-1 to 111-3 of the sector control portion 120-1 to 120-3 of the base station 110' uses a control program stored in memories 112-1 to 112-3 to control the wireless IF units 116-1 to 116-3 of the sectors and communication processors 117-1 to 117-3 of the sectors in response to an instruction from the apparatus management portion 121.

These units are connected through an internal bus 115. An I/O 114 connected to the internal bus 115 is an interface with the network managing device 250 and exchanges, through a control signal communication path 600, a control signal (or command signal) and various kinds of data required for control of the operation and maintenance of the communication network 10'. Here, the I/O 114 may be removed and the main signal communication path 500 may be used to add these control signal and data to the signals exchanged through the main signal communication path 500. Then, the resulting signals may be exchanged through a line IF unit 118.

In the base station 110', upon the upgrading of communication services provided in the wireless communication network 10', the CPU 111-4 of the apparatus management portion 121 upgrades software (such as a control program) stored in the memories 112-1 to 112-4 of the apparatus management portion 121 and the sector control portions 120-1 to 120-3 or firmware (such as a control program) stored in the wireless IF units 116-1 to 116-3, communication processing units 117-1 to 117-3 and line IF unit 118 by following steps and performing operations mentioned below and by keeping the base station in use (in operation or at on-line state). The operation for upgrading software and/or firmware while the base station is being used may be called on-line upgrading hereinafter.

Figure 16:
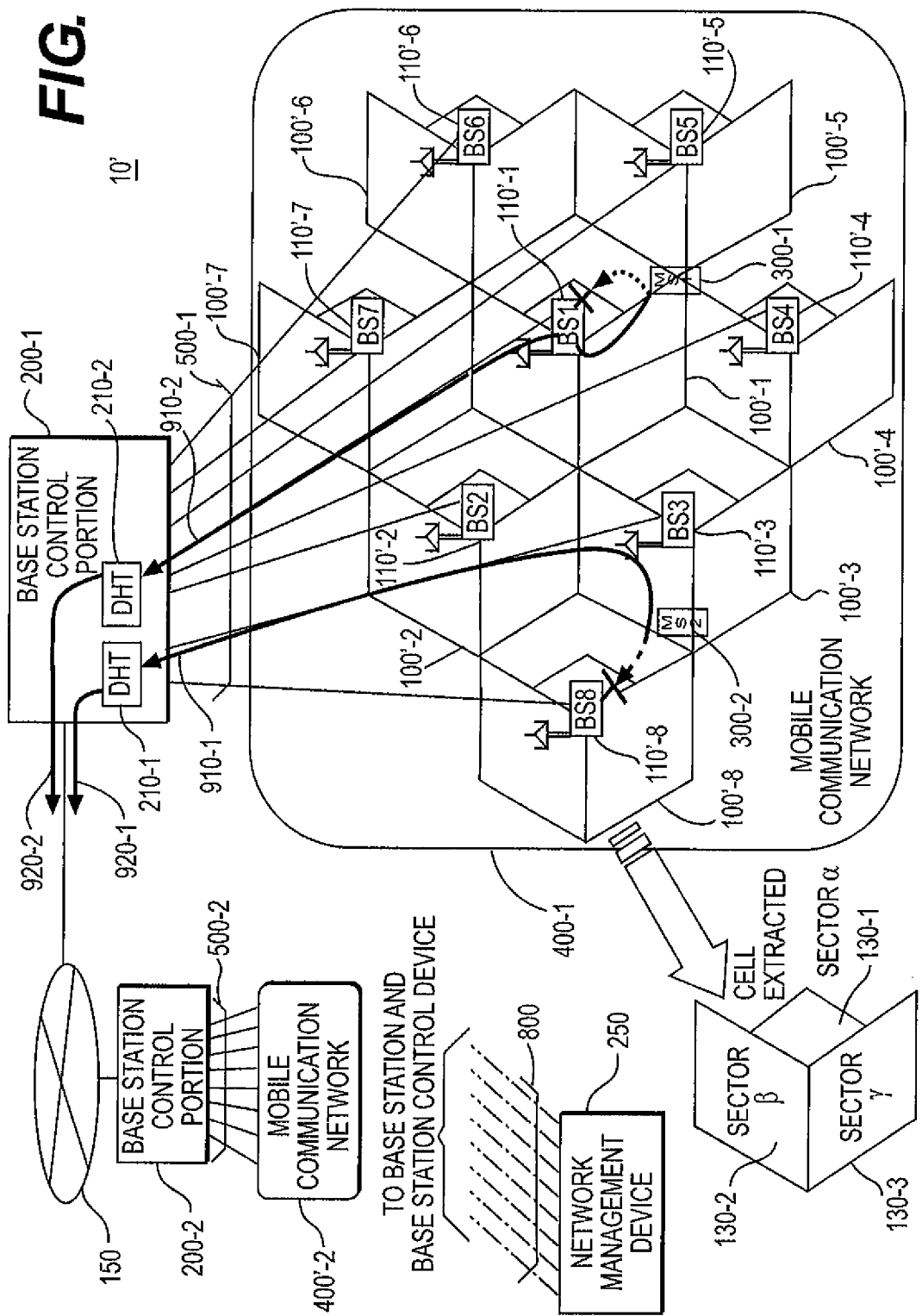
FIG. 16 is a block diagram showing a construction of a wireless communication network in which one base station has plural sectors and showing another operational example.

FIG. 16 is a block diagram showing a construction and operational example of a wireless communication network where the transmission wave output of the sector .alpha. 120-1 of the base stations BS1 110'-1 to BS8 110'-8 is lower than the one in FIG. 14. While the sector .alpha. 120-1 of the base stations BS1 110'-1 covers the area having a terminal MS1 300-1 in FIG. 14, the area covered by the sector .alpha. 120-1 of the base stations BS1 110'-1 is reduced since the output of the transmission wave of the sector .alpha. 120-1 of the base station is reduced in FIG. 16. Thus, the area having the MS1 300-1 cannot be covered. Then, similarly, the sector .alpha. of the BS8 110'-8 cannot cover the area having the terminal MS2 300-2. Therefore, the terminal MS 300-1 cannot set the communication path 900-2 with the sector .alpha. of the base stations BS1 110'-1 and can only set the communication path with the sector .gamma. of the base stations BS1 110'-1. While the terminal MS1 300-1 selects the communication path 900-2 having good communication quality in FIG. 14, the communication path 900-2 cannot be set in FIG. 16. Therefore, the communication path is switched to the communication path 910-2 by the DHT 210-2 of the base station control portion 200-1. For the same reason, the communication path 900-1 is switched to the communication path 910-1 for the terminal MS2. The base station control portion 200-1 communicates with a destination terminal by using signals 920-1 and 920-2 from the switched communication paths.

By controlling the transmission waves of base stations, the communication paths being providing communication services can be switched without blackouts from specific sectors of the base stations. Then, the base station no longer provides the communication service. Under this condition, the processing for software upgrading and returning the transmission waves to the original state after the software upgrading is performed sequentially on the base stations and the plural sectors (.alpha., .beta. and .gamma.) control portions. Thus, software in the base stations in the wireless communication network can be upgraded without the blackouts of communication services.

Figure 17:
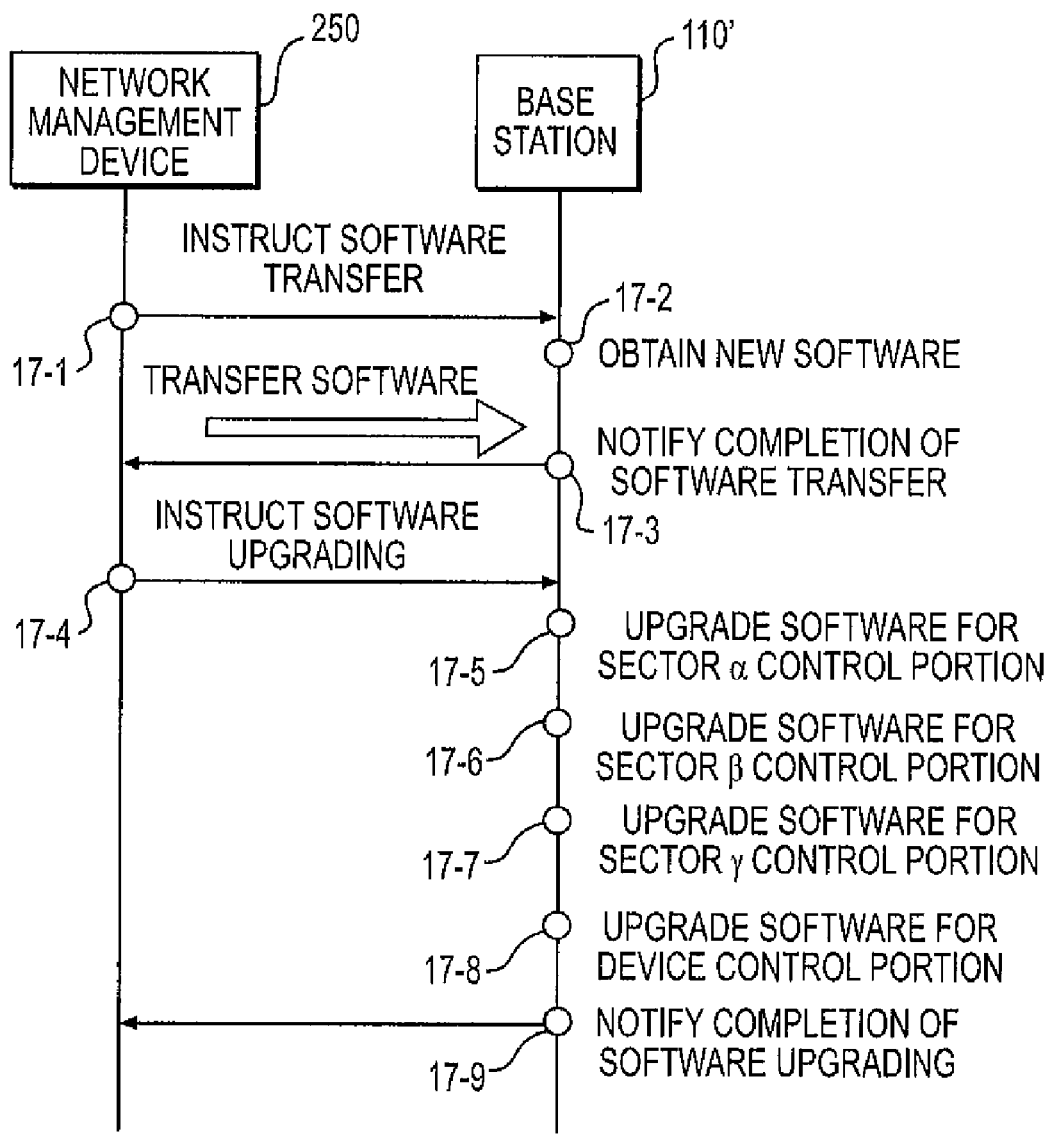
FIG. 17 is an operational explanatory diagram for describing an example of a software upgrading operation in a base station.
Figure 18:
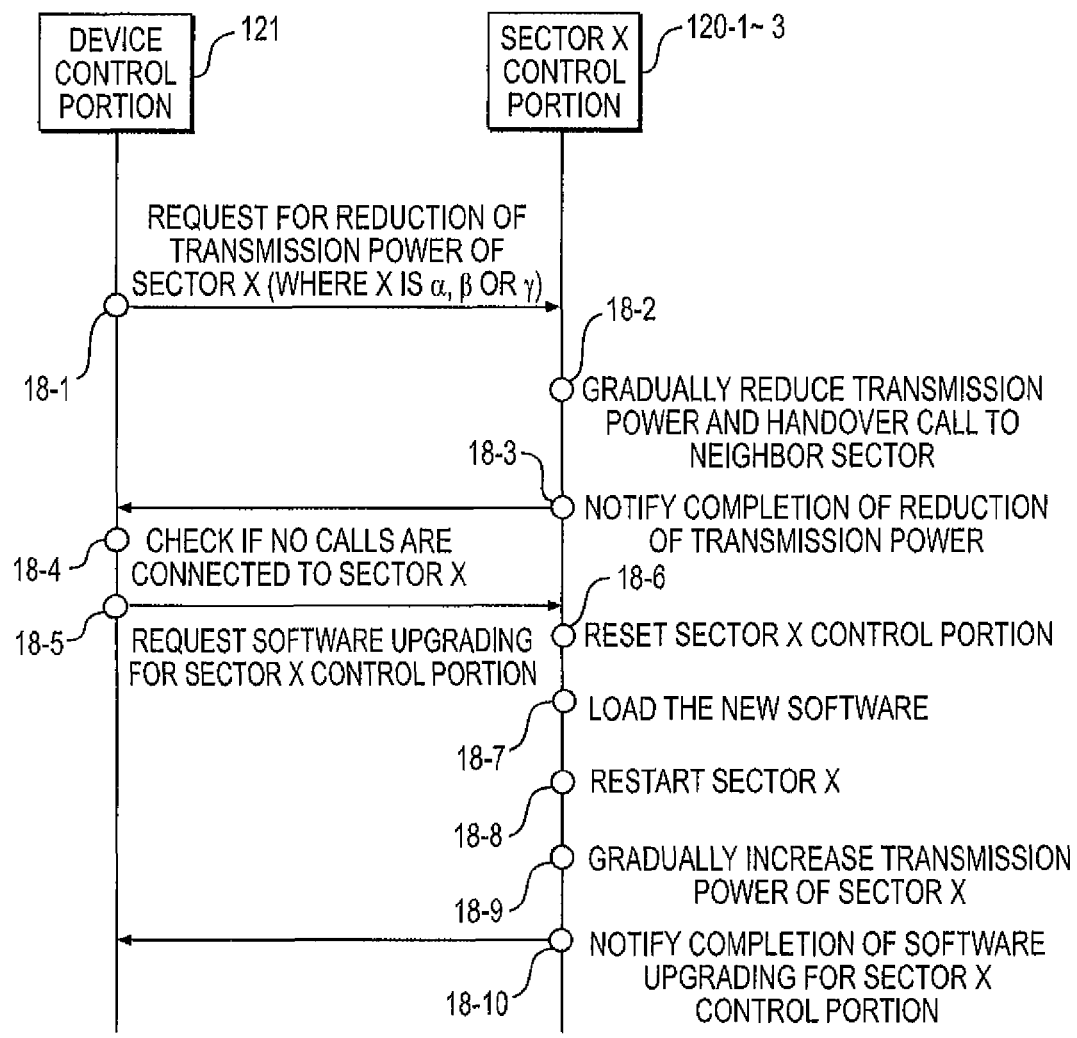
FIG. 18 is an operational explanatory diagram showing a partial detail of an operational example for upgrading software in a base station.
Figure 19:
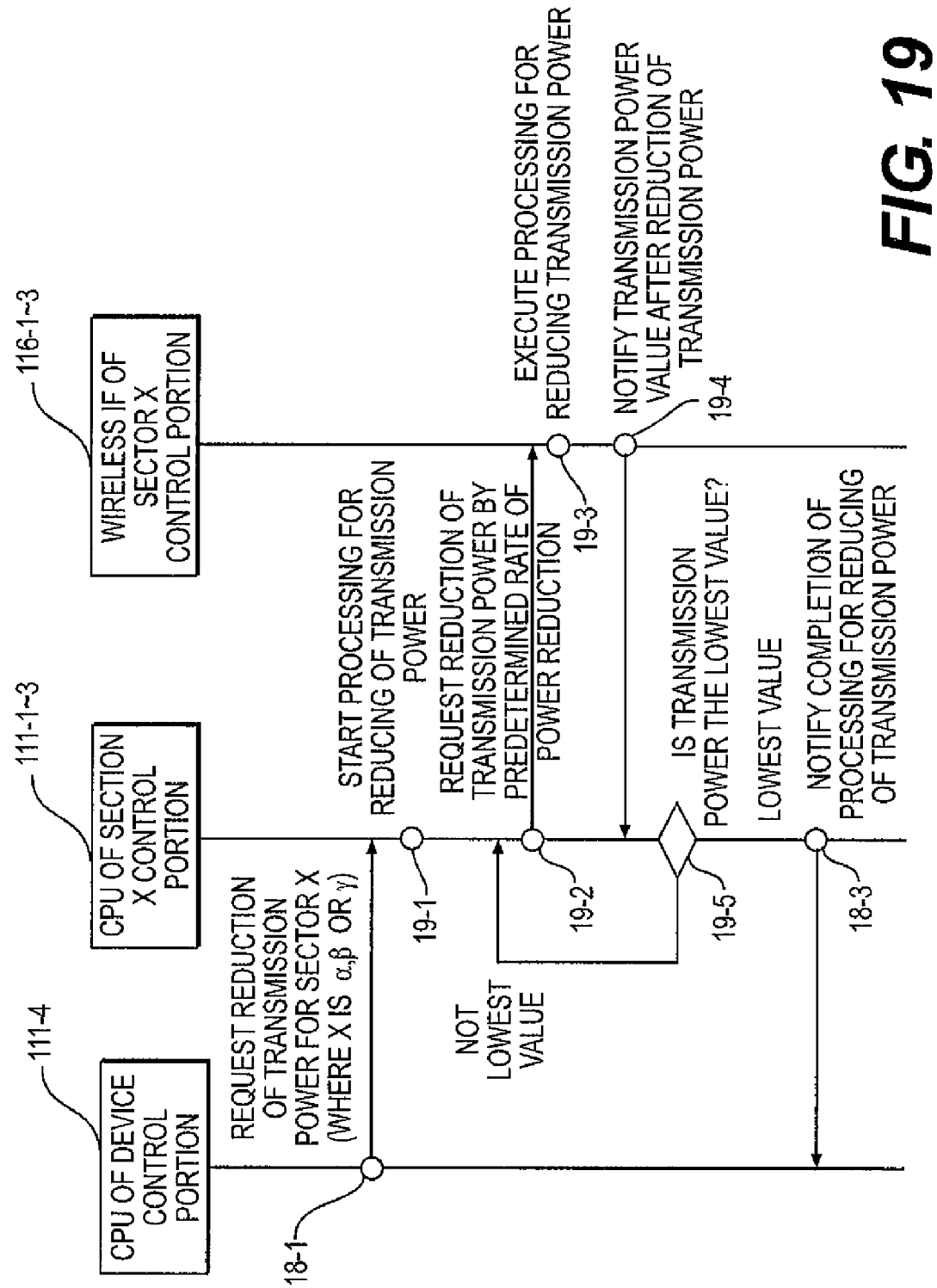
FIG. 19 is an operational explanatory diagram showing an operational example of a sector control portion within a base station for upgrading software.
Figure 20:
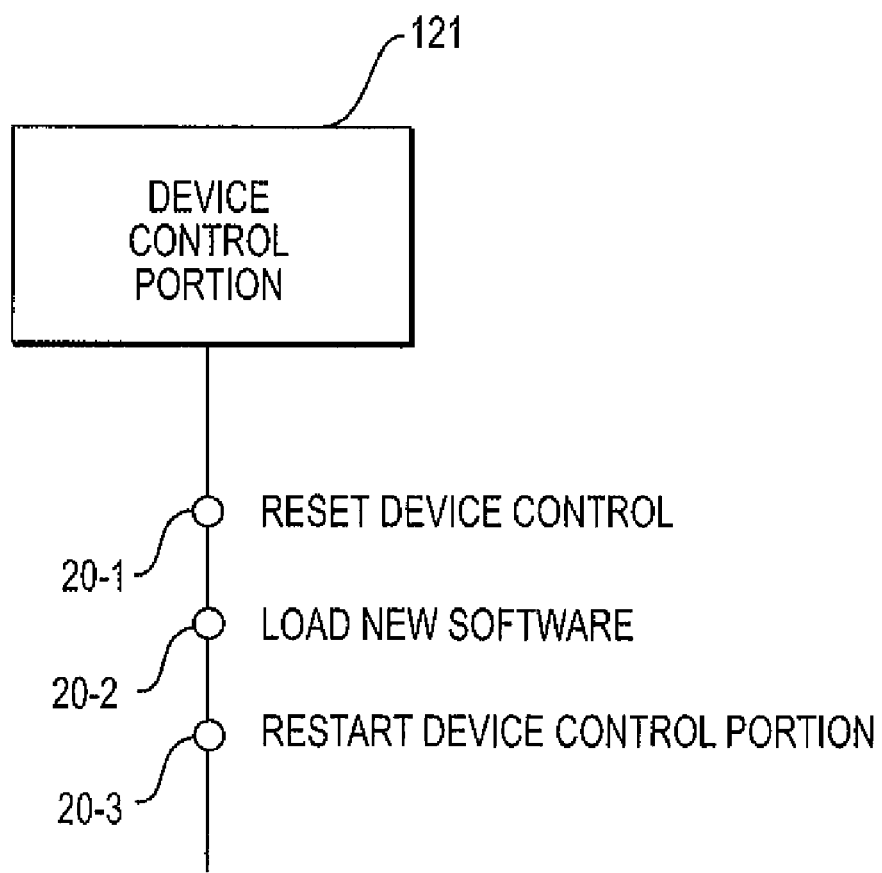
FIG. 20 is an operational explanatory diagram showing an operational example of an apparatus control portion within a base station in which software is upgraded.

FIG. 17 is an operational explanatory diagram describing an example of a software upgrading operation in a base station. The network management device 250 performs software-transfer instructing processing on base stations (step 17-1). Each of the base stations obtains new software by performing processing for obtaining new software (step 17-2) and notifies the network management device 250 on the completion of the software transfer (step 17-3). Next, the network management device 250 instructs each of the base stations to upgrade software (step 17-4). The software upgrading processing (step 17-5) for the sector .alpha. control portion, software upgrading processing (step 17-6) for the sector .beta. control portion and software upgrading processing (step 17-7) for the sector .gamma. control portion are performed sequentially. After the end of the software upgrading processing for the device control portion (step 17-8), the end of the software upgrading is notified to the network management device (step 17-9). FIG. 18 shows details of the software upgrading processing (steps 17-5 to 17-7) for the sector control portions. FIG. 19 shows further details thereof. FIG. 20 shows details of the software upgrading processing (step 17-9) for the device control portion.

FIG. 18 is an operational flow diagram describing details of the software upgrading processing (steps 17-5 to 17-7) for the sector control portions. First of all, the device control portion 121 performs processing for requesting the reduction of transmission power on the sector X (where X is .alpha., .beta. or .gamma.) control portion 120 (step 18-1). The sector X control portion 120 gradually reduces the transmission power (step 18-2). Thus, the call being processed by the sector X is handed over to the neighbor sector, and the communication service for the call is kept. When the transmission power reducing processing has completed, the sector X control portion 120 notifies the apparatus control portion 121 of the completion (step 18-3). The apparatus control portion 121 checks whether no calls are connecting to the sector X or not (step 18-4). After that, the apparatus control portion 121 requests the software upgrading for the sector X control portion 120 to the sector X control portion 120 (step 18-5). In response to the request for the software upgrading request, the sector X control portion 120 resets the sector X control portion 120 (step 18-6). Thus, the sector X control portion 120 loads new software (step 18-7). After that, the sector X control portion 120 restarts the sector X (step 18-8) and gradually increases the transmission power of the sector X (step 18-9). Thus, the communication processing by the sector X can be implemented again. Upon the completion of the processing for gradually increasing the transmission power of the sector X (step 18-9), the sector X control portion 120 notifies the apparatus control portion 121 of the completion of the software upgrading (18-10). In order to hand over the call to the neighbor sector, the processing in FIG. 18 is not performed on the sector (.alpha., .beta. and .beta.) control portions at the same time and is sequentially performed thereto as shown in the software upgrading processing (steps 17-5 to 17-7) for the sector control portions in FIG. 17.

FIG. 19 is an operational flow diagram describing the step for gradually reducing the transmission power (step 18-2) shown in FIG. 18. In response to the request for reducing the transmission power from the CPU 111-4 of the device control portion (step 18-1), the CPU 111-1 111-2 or 111-3 of the sector X control portion 120 starts reducing the transmission power (step 19-1). The CPU 111-1 111-2 or 111-3 requests the wireless IF 116-1 116-2 or 116-3 to reduce the transmission power by a predetermined rate of the power reduction (step 19-2). In response to the request, the wireless IF 116-1 116-2 or 116-3 reduces the transmission power (step 19-3). Then, the transmission power value after the transmission power reduction is notified to the CPUs (111-1 to 111-3). The CPU 111-1 111-2 or 111-3 checks if the power value notified from the wireless IF 116-1 116-2 or 116-3 is the lowest value of the transmission power or not (step 19-5). If not, the step 19-2 is performed again. If the notified power value reaches the lowest value, the completion of the reduction of the transmission power is notified (step 18-3).

The processing allows a base station to gradually reduce transmission power of a sector within the base station, switch a communication path in which a communication service is being provided in the base station to one in an adjacent sector or an adjacent base station to create a state that no communication service is available in the sector of the base station and then upgrade software.

FIG. 20 is an operational flow diagram describing details of the step 17-9 of software upgrading by the device control portion 121 in the base station in FIG. 17. The device control portion 121 loads new software (step 20-2) by resetting the device control portion 121 itself (step 20-1) and resets the device control portion 121 (step 20-3). Since the resetting of the device control portion 121 does not affect on the main signal communication path 500, software upgrading does not interrupt a communication service even during software upgrading in the device control portion 121.

[Third Software Upgrading]

Next, another wireless communication network according to this embodiment will be described below.

Figure 21:
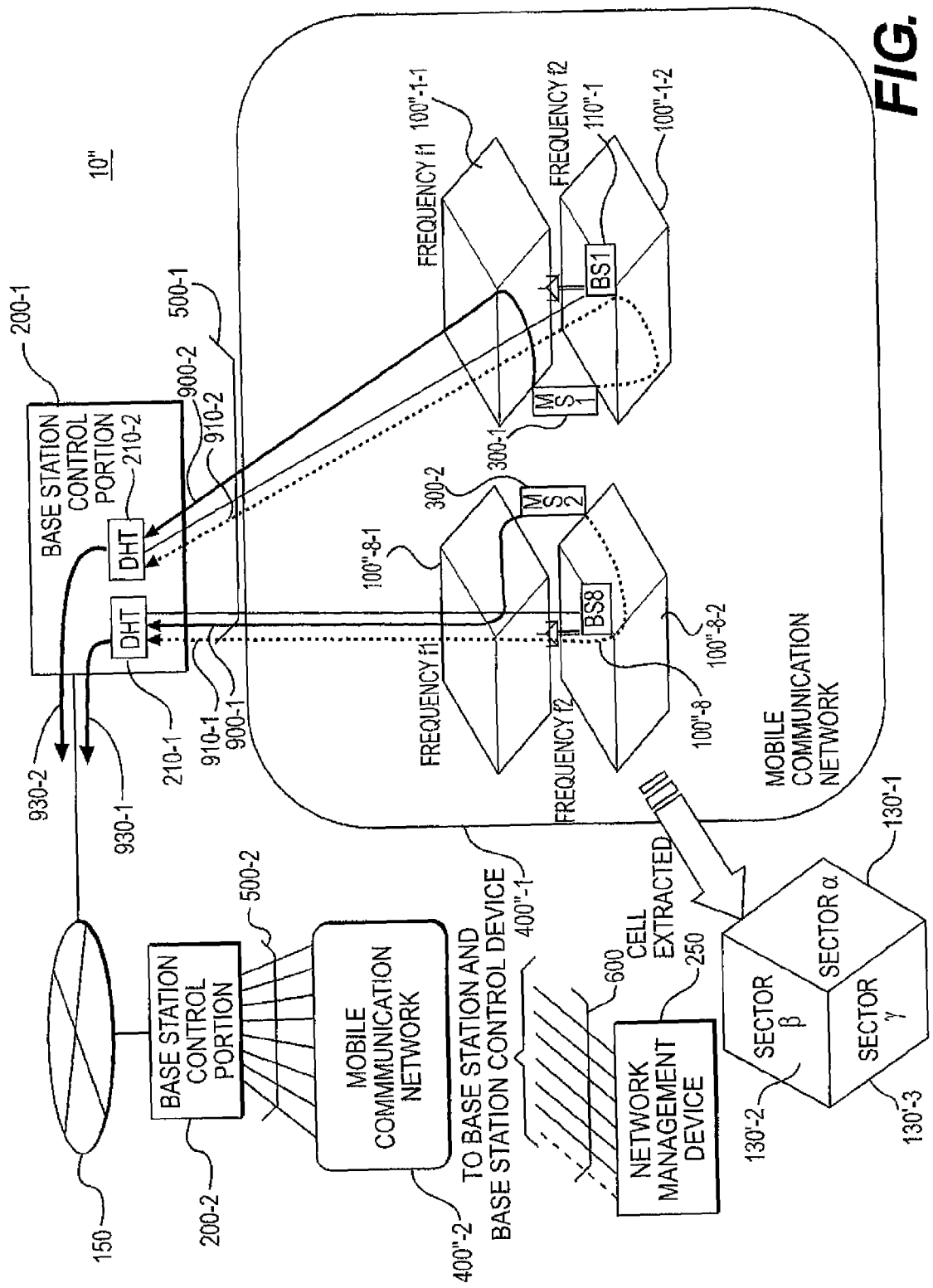
FIG. 21 is a block diagram showing a construction and operational example of a wireless communication network in which one base station has multiple sectors and multiple frequencies.

FIG. 21 is a block diagram showing a construction example of a wireless communication network according to this embodiment. A wireless communication network 10" includes a construction which will be described be low and performs communication between/among terminals.

Multiple mobile terminals MS1 300-1 and MS2 300-2 and multiple wireless communication apparatus (called base stations hereinafter) BS1 110"-1 and BS8 110"-8 are connected through a wireless communication path (not shown). More specifically, each base station BS includes multiple radio coverages called sectors 130'-1 to 130'-3 separately of multiple frequencies and performs wireless communication using the terminal MS and CDMA. In the shown example, communication paths 900-2 and 910-2 can be defined with the sector .gamma. of a frequency f1 100"-1-1 and the sector of a frequency f2 100"-1-2 of the base station BS1 through the terminal MS1 300-1. Furthermore, communication paths 900-1 and 910-1 can be defined with the sector .alpha. of a frequency f1 100"-8-1 and the sector .alpha. of a frequency f2 100"-8-2 of the base station BS8 through the terminal MS2 300-2. Notably, in the description of this embodiment, an area that these multiple base stations BS1 110"-1 and BS8 110"-8 can communicate with the terminals MS is called mobile communication network 400". The base station 110" can have any number of frequencies, not limiting to the number shown in FIG. 21. Frequencies of the base station 110" may have different frequency bands from each other. For example, the frequency f1 and frequency f2 may have a band of 800 MHz and a band of 2 GHz, respectively.

The base stations BS1 110"-1 and BS8 110"-8 in the mobile communication network 400"-1 are connected through a base station control portion (or controller) 200-1 and a communication path 500-1. The base station control portion 200 includes a diversity handover unit (DHT) 210 for performing software handover provided by Section 5.2.1, TR25.832 of 3GPP (refer to Non-Patent Document 1) and performs communication through one communication path having good communication quality selected from multiple communication paths 900 and 910, which will be described in more detail later.

When the terminal MS1 300-1 calls a terminal MS in the same mobile communication network 400"-1, the base station control portion 200-1 communicates with the called terminal MS by returning a signal 930 selected by the DHT 210 to one of the subordinate base stations BS1 110"-1 and BS8 110"-8. On the other hand, when the terminal MS1 300-1 calls a terminal in another mobile communication network 400"-2 (the detail construction of which is substantially the same as that of the mobile communication network 400"-1 and the description of which will be omitted herein), the base station control portion 200-1 exchanges signals with the called terminal MS by using a base station control portion 200-2 and a mobile communication network 400"-2 through a communication network 150 connecting the base station control portions 200. The communication network 150 may be a public network, a dedicated line network or a private network. The mobile communication network 400"-2 may be a so-called fixed network including a wired communication network and a terminal fixed therein.

The network management device 250 is connected to a base stations BS 110" and base station control portions 200 provided in the communication network 10" through a control signal communication path 600 through which control signals for monitoring, maintenance and so on are exchanged and manages and/or controls the entire facility of the communication network 10" by upgrading software in the base stations 110", for example. Notably, any numbers of base station BS (110"), base station control portion (200) and network management device 250 may be provided, not limiting to the numbers shown in FIG. 21.

Figure 22:
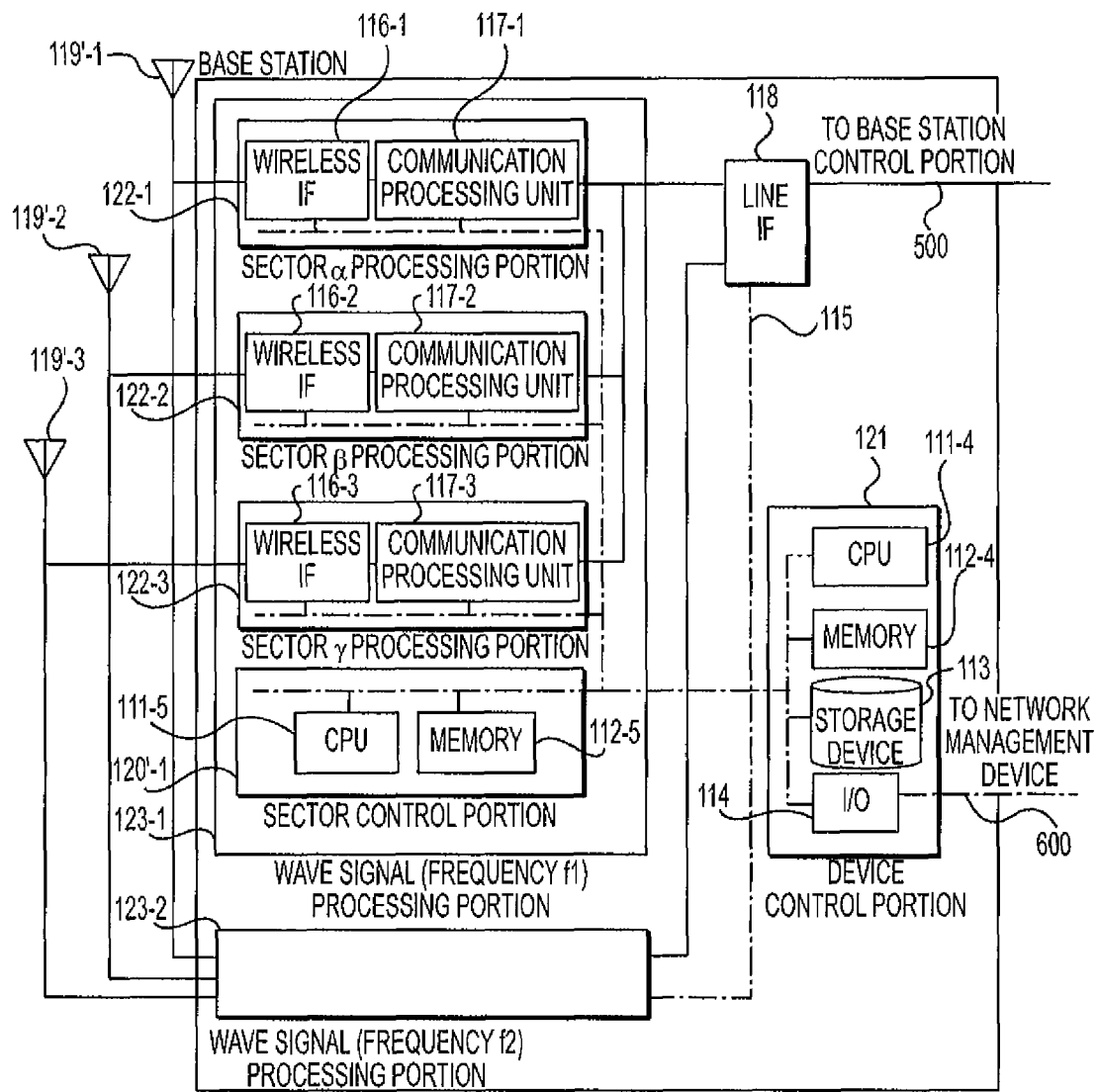
FIG. 22 is a block diagram showing a construction example of abase station having multiple sectors and multiple frequencies.

FIG. 22 is a block diagram showing a construction example of a base station provided in the communication network. The base station 110" has a construction which will be described below and connects between the terminal MS 300 and the base station control portion 200 and/or communicates with the network management device 250.

The base station 110" includes wave signal processing portions 123-1 and 123-2, one for each frequency, and a line IF 118, and a device control portion 121. A wave signal (frequency f1) processing portion 123-1 includes sector processing portions 122-1, 122-2 and 122-3 (which will be called sector .alpha. processing portion, sector .beta. processing portion and sector .gamma. processing portion) and the sector control portion 120'-1. The sector processing portions 122-1, 122-2 and 122-3 have wireless IFs (first wireless IFs) 116-1 to 116-3 for sectors .alpha., .beta. and .gamma. and communication processing units (first communication processing portions) 117-1 to 117-3 for sectors .alpha., .beta. and .gamma. Similarly, a wave signal (frequency f2) processing portion 123-2 includes sector processing portions and the sector control portion. The sector processing portions have wireless IFs (second wireless IFs) for sectors .alpha., .beta. and .gamma. and communication processing units (second communication processing portions) for sectors .alpha., .beta. and .gamma.

When the base station 110" receives a signal (wave signal) transmitted from the terminal MS 300 through a wireless communication path, not shown, by an antenna 119'-1, the wireless IF unit 116-1 of the sector .alpha. processing portion 122-1 of the wave signal (frequency f1) processing portion 123-1 performs end processing such as conversion of the received signal to an electric signal. The communication processing unit 117-1 of the sector .alpha. processing portion 122-1 performs processing (such as processing for communication for call control, for example) for performing a communication service on the signal after the end processing, and the line IF unit 118 matches the interface with that of the base station control portion 200 and then transmits the signal to the base station control portion 200 through the main signal communication path 500. The sector control portion 120'-1 controls the sector .alpha. processing portion 122-1 by using a CPU 111-5 and a memory 112-5. The base station 110" transmits a signal from the base station control portion 200 to the terminal MS 300 in the reverse order of these steps.

The processing performed for the case that the sector .alpha. processing portion 122-1 of the wave signal (frequency f1) processing portion 123-1 sends/receives a signal (wave signal) (where the signal has the frequency f1) is also performed f or cases that the sector .beta. processing portion 122-2 of the wave signal (frequency f1) processing portion 123-1 and the sector .gamma. processing portion 122-3 of the wave signal (frequency f1) processing portion 123-1 send/receive a signal (wave signal). The same is true for a case where each of the sector control portions (the construction of which is identical to that of each of the sector control portions of the wave signal (frequency f1) processing portion 123-1 and is not shown) of the wave signal (frequency f2) processing portion 123-2 sends and receives a signal (wave signal) (where the signal has the frequency f2).

A CPU 111-4 of the device control portion 121 of the base station 110" controls the entire base station 110" including the wave signal processing portions 123-1 and 123-2 and the line IF 118 by using a control program stored in a memory 112-4 and data required for operating the wireless communication network 10" (for example, terminal information), which is stored in a storage device 113.

A CPU 111-5 of the sector control portion 120'-1 of each of the wave signal processing portions 123 of the base station 110" controls the wireless IF units 116-1 to 116-3 for sectors and communication processing units 117-1 to 117-3 by using a control program stored in the memory 112-5 in response to a request from the device control portion 121.

These units and so on are connected to an internal bus 115. An I/O 114 connecting to the internal bus 115 is an interface with the network management device 250 and exchanges control signals (such as a command) and various kinds of data required for operations, maintenance and so on of the communication network 10" through a control signal communication path 600. Those control signals and data may be added to a signal to be exchanged through the main signal communication path 500 without the I/O 114 and may be exchanged through the line IF unit 118.

In the base station 110", with the upgrading of a communication service available in the wireless communication network 10", the CPU 111-4 of the device control portion 121 upgrades software (such as a control program) stored in the device control portion 121 and the memory 112-5 of the sector control portion 120'-1 of each of the wave signal processing portions 123-1 and 123-2 or firmware (such as a control program) stored in the wireless IF units 116-1 to 116-3, communication processing units 117-1 to 117-3 and line IF unit 118 by performing steps and operations, which will be described later, with the base station kept in use (in operation or on line). In the following description of this embodiment, the operation for upgrading software or firmware as described above with the base station kept in use may be called online upgrading.

Figure 23:
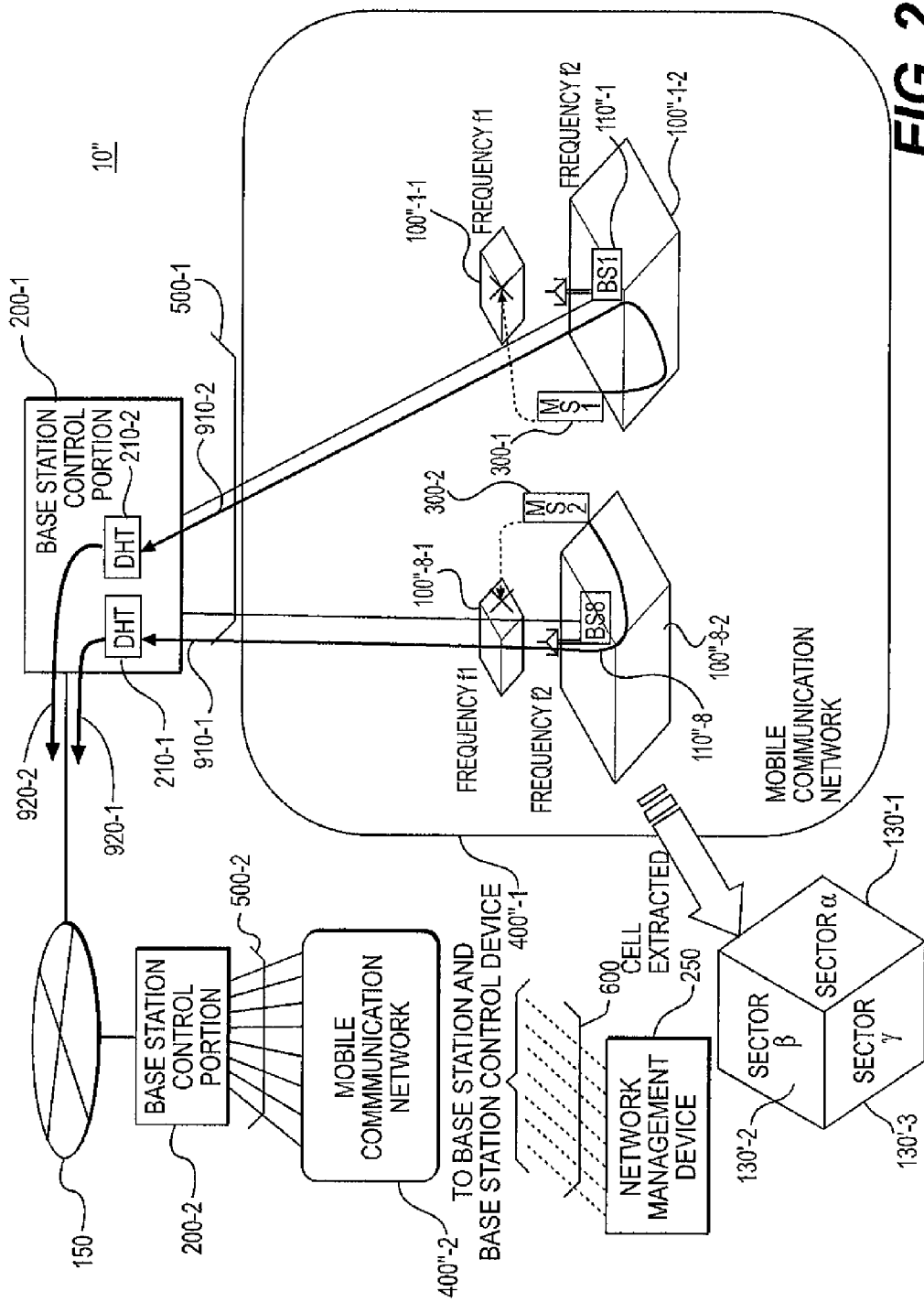
FIG. 23 is a block diagram showing a construction and another operational example of a wireless communication network in which one base station has multiple sectors and multiple frequencies.

FIG. 23 is a block diagram showing a construction and operational example of the wireless communication network when the transmission waves of the frequency f1 of the base stations BS1 110"-1 and BS8 110"-8 are lower than those of FIG. 21. In FIG. 21, the frequency f1 100"-1-1 of the base station BS1 110"-1 covers an area having the terminal MS1 300-1 while, in FIG. 23, the area covered by the frequency f1 100"-1-1 of the base station BS1 110"-1 is reduced since the transmission waves of the frequency f1 of the base stations are reduced and the area having the terminal MS1 300-1 cannot be therefore covered. The frequency f1 100"-8-1 of the base station BS8 110"-8 cannot cover the area having the terminal MS2 300-2 either.

Thus, the terminal MS1 300-1 cannot define the communication path 900-2 with the frequency f1 100"-1-1 of the base station BS1 110"-1 and can only define a communication path with the frequency f2 100"-1-2 of the base station BS1 110"-1. Though the terminal MS1 300-1 selects the communication path 900-2 having good communication quality in FIG. 21, the communication path 900-2 is switched to the communication path 910-2 by the DHT 210-2 or 210-1 in the base station control portion 200-1 in FIG. 23 since the terminal MS1 300-1 can no longer define the communication path 900-2. The same is true for the terminal MS2, and the communication path 900-1 is switched to the communication path 910-1. Furthermore, the base station control portion 200-1 communicates with a called terminal by using signals 920-1 and 920-2 from the switched communication path.

The control of transmission waves of base stations can switch the communication path in which a communication service is being provided from a specific frequency of each of the base stations without instantaneous interruption, resulting in a state that no communication service is available at the frequency. Software upgrading is performed under the state and processing for returning the transmission waves to the original state is performed sequentially on multiple frequency (f1 and f2) processing portions and base stations after the software upgrading so that software in a base station within the wireless communication network can be upgraded without blackouts of the communication services.

Figure 24:
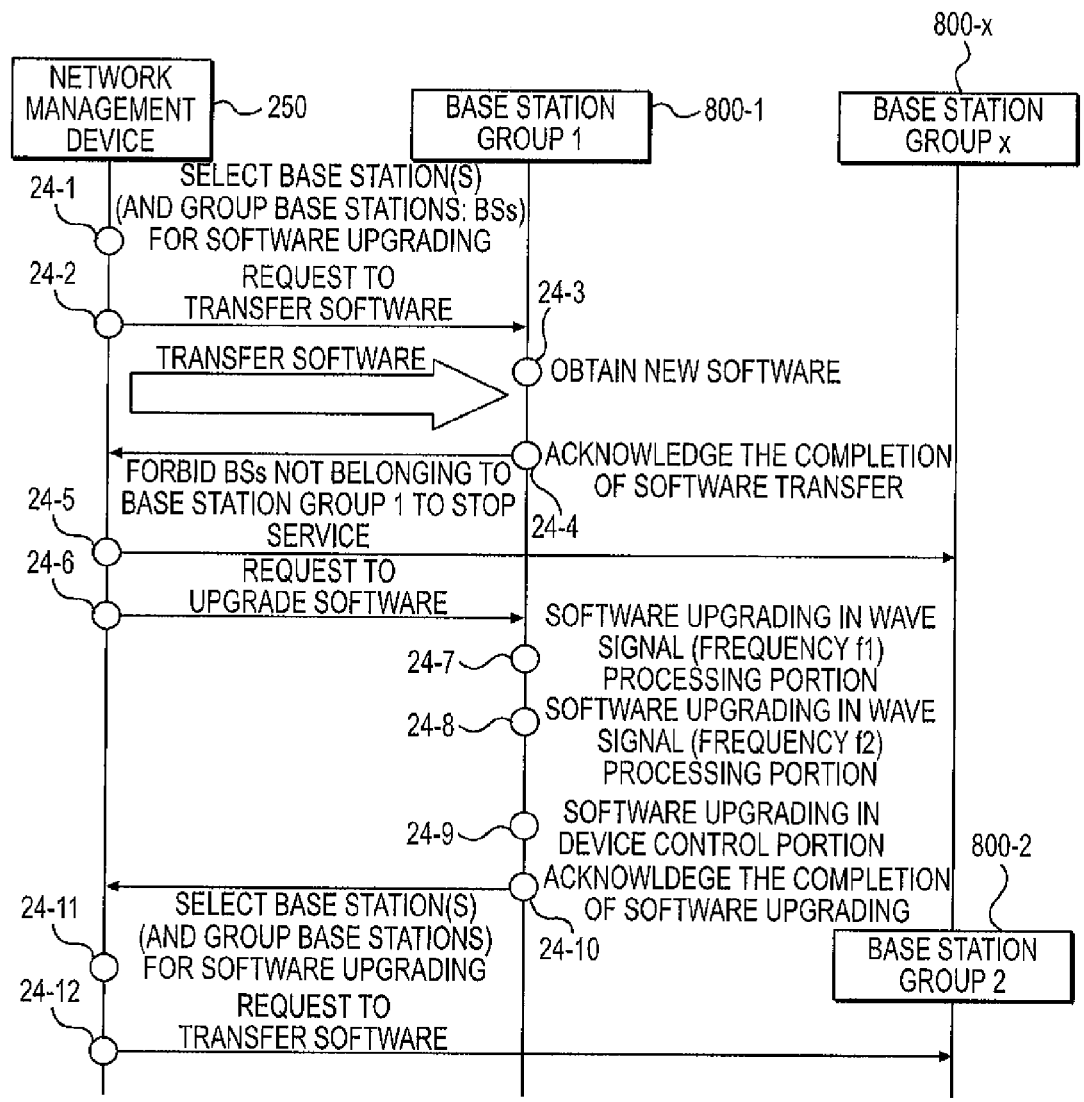
FIG. 24 is an operational explanatory diagram for describing an example of a software upgrading operation of a base station.

FIG. 24 is an operational explanatory diagram for describing an example of a software upgrading operation in a base station. The network management device 250 performs a step 24-1 of selecting (and grouping) base stations having software to upgrade under a predetermined rule. A group of base stations selected in the step 24-1 is called base station group 1 (800-1), hereinafter. The selection of base stations can be implemented by using the method described with reference to FIGS. 7 to 12, for example. The number of call connections is managed for each sector and each frequency, and the number of call connections of a base station may be the sum value thereof.

When the network management device 250 performs a step 24-2 of requesting the base station group 1 (800-1) for software transfer, base stations belonging to the base station group 1 (800-1) perform a step 24-3 of obtaining new software and obtain new software through the line IF 118, for example, and perform a step 24-4 of acknowledging the completion of the software transfer to the network management device 250. The network management device 250 performs a step 24-5 of forbidding a base station 800-x not belonging to the base station group 1 (800-1) to perform a service stop operation and performs a step 24-6 of requesting the base station group 1 (800-1) for software upgrading. The step 24-5 may be omitted.

Figure 25:
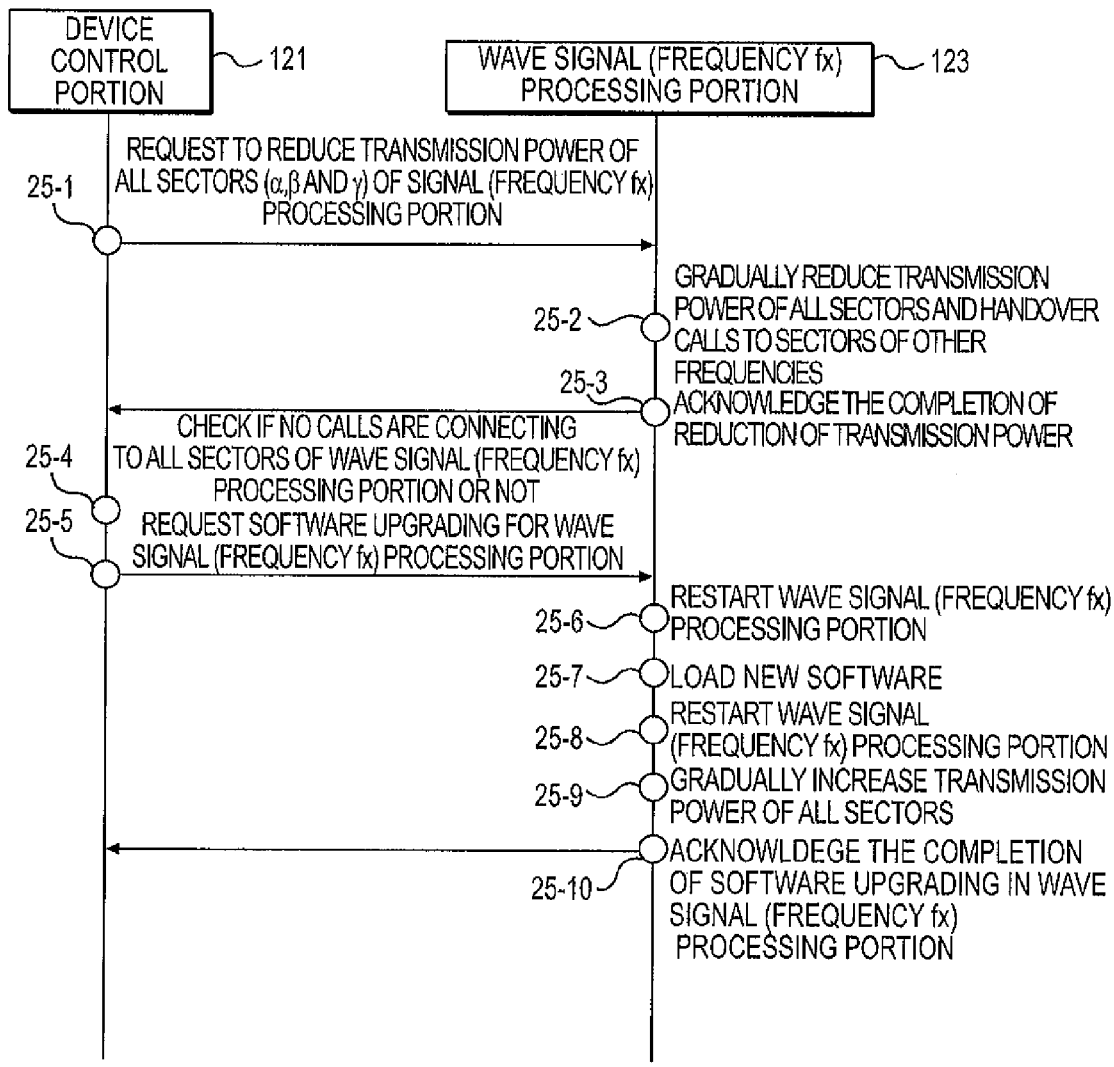
FIG. 25 is an operational explanatory diagram showing partial details of the operational example of a base station for software upgrading.
Figure 26:
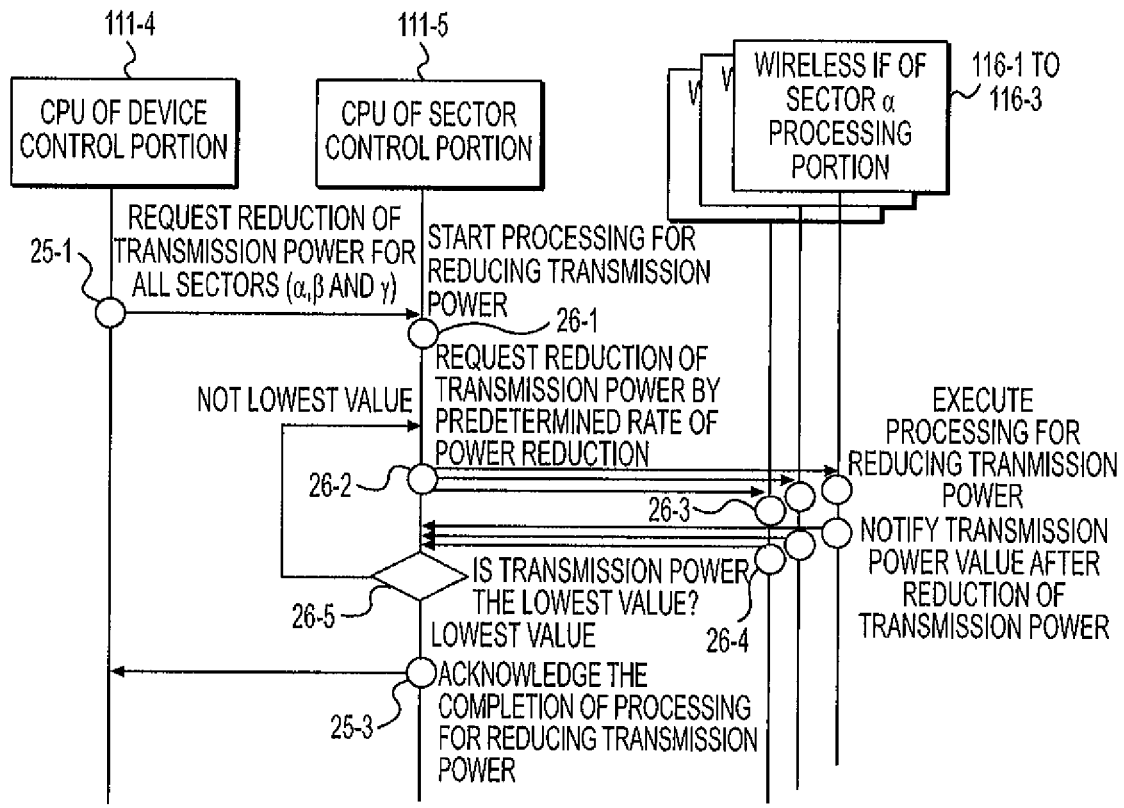
FIG. 26 is an operational explanatory diagram showing an operational example of a wave signal processing portion within a base station for software upgrading.

In response to the request, base stations belonging to the base station group 1 (800-1) sequentially perform a step 24-7 of upgrading software in the wave signal (frequency f1) processing portion and a step 24-8 of upgrading software in the wave signal (frequency f2) processing portion, a step 24-9 of upgrading software in the device control portion 121 and then a step 24-10 of acknowledging the completion of the software upgrading to the network management device 250. The detail steps and further detail steps of the software upgrading processing (in the steps 24-7 and 24-8) in the wave signal processing portions are shown in FIGS. 25 and 26, respectively, the detail descriptions of which will be given later. The detail steps of the software upgrading processing (in the step 24-9) in the device control portion 121 are the same as the processing shown in FIG. 20. The processing (in the steps 24-7, 24-8 and 24-9) can be performed in any order. For example, one of predetermined frequencies may be sequentially selected, and the software upgrading processing (in the steps 24-7 and 24-8) can be performed for the selected frequency.

In response to the acknowledgement of the completion of software upgrading from all base stations belonging to the base station group 1 (800-1), the network management device 250 performs a step 24-11 of newly selecting (and grouping) base stations having software to upgrade. A group of the selected base stations is called base station group 2 (800-2), hereinafter. The network management device 250 performs a step 24-12 of requesting the base station group 2 (800-2) to transfer software. The step 24-12 is identical to the step 24-2. The network management device 250 also performs the same processing on the base station group 2 (800-2) as the processing 24-2 to 24-10, which is performed on the base station group 1 (800-1). Software in all base stations can be upgraded by repeating these steps until base stations not belonging to any base station group no longer remain.

Software upgrading can be performed without service blackouts by selecting base stations having software to upgrade as described above also in a wireless communication network having both base stations (each having the construction shown in FIG. 22, for example) communicable at multiple frequencies and base stations (each having the construction shown in FIG. 2) communicable at one frequency. While, according to this embodiment, a base station group is created, software upgrading may be sequentially performed for each frequency on all base stations without creating a group. In this case, the step 24-1 may be omitted.

FIG. 25 is an operational flow diagram for describing the detail steps of the software upgrading processing (in the steps 24-7 and 24-8) in the wave signal processing portions. First of all, the device control portion 121 performs a step 25-1 of requesting the wave signal (frequency fx, where x is 1 or 2) processing portion 123-*x* to reduce transmission power of all sectors. The wave signal (frequency fx) processing portion 123-*x* performs a step 25-2 of gradually reducing the transmission power of all sectors. Thus, a call covered by the frequency fx is handed over to another frequency, and the communication service for the call is continued. On the other hand, no communication service is available at the frequency fx. Upon completion of the processing for reducing transmission power of the all sectors, the wave signal (frequency fx) processing portion 123-*x* performs a step 25-3 of acknowledging the completion to the device control portion 121.

The device control portion 121 performs a step 25-4 of checking if no calls are connecting to all sectors of the wave signal (frequency fx) processing portion 123-*x* or not and then performs a step 25-5 of requesting the wave signal (frequency fx) processing portion 123-*x* to upgrade software in the wave signal (frequency fx) processing portion 123-*x*. The wave signal (frequency fx) processing portion 123-*x* performs a step 25-6 of resetting the wave signal (frequency fx) processing 123-*x* itself in response to the request for software upgrading and thereby performs a step 25-7 of loading new software. Here, the software to be loaded may be the software obtained in the step 24-3, for example. Then, the wave signal (frequency fx) processing portion 123-*x* performs a step 25-8 of restarting the wave signal (frequency fx) processing portion 123-*x* and a step 25-9 of gradually increasing transmission power of all sectors included in the wave signal (frequency fx) processing portion 123-*x* so that communication processing of all sectors of the frequency f1 is enabled again.

Upon completion of the step 25-9 of gradually increasing transmission power of all sectors included in the wave signal (frequency fx) processing portion 123-*x*, the wave signal (frequency fx) processing portion 123-*x* performs a step 25-10 of acknowledging the completion of software upgrading to the device control portion 121. In order to allow the handover of a call to each sector of another frequency, the steps in FIG. 25 may be sequentially performed like the software upgrading processing (in the steps 24-7 and 24-8) in the wave signal processing portions 123 in FIG. 24 without performing the processing on the wave signal processing portions 123 at the same time.

FIG. 26 is an operational flow diagram for describing details of the step 25-2 of gradually reducing transmission power of all sectors shown in FIG. 25 for the frequency f1. Notably, the same is true for the frequency f2. In response to the request to reduce transmission power from the CPU 111-4 of the device control portion (step 25-1), the CPU 111-5 of the sector control portion 120'-1 of the wave signal (frequency f1) processing portion 123-1 starts a step 26-1 of reducing transmission power. The CPU 111-5 performs a step 26-2 of requesting wireless IFs 116-1 to 116-3 to reduce transmission power by a predetermined rate of power reduction.

In response thereto, the wireless IFs 116-1 to 116-3 perform a step 26-3 of reducing transmission power and performs a step 26-4 of notifying a transmission power value after the reduction of transmission power to the CPU 111-5. The CPU 111-5 performs a step 26-5 of determining whether the power value notified by the wireless IFs 116-1 to 116-3 is the lowest power value of the transmission power or not and, if not, performs the step 26-2 again. If the notified power value reaches the lowest value, a step 26-3 of ending the reduction of transmission power is performed.

The processing allows a base station to gradually reduce transmission power of the frequency fx of all sectors within the base station and allows switching a communication path in which a communication service is being provided in the base station to one at another frequency, resulting in a state that no communication service is available at the frequency fx of all sectors within the base station. Thus, software can be upgraded in a module relating to the frequency fx, that is, the wave signal (frequency fx) processing portion. While the processing increases or reduces the transmission power of the frequency fx of all sectors, transmission power for sectors may be sequentially increased or reduced.

[Fourth Software Upgrading]

Next, another wireless communication network according to this embodiment will be described below.

Figure 27:
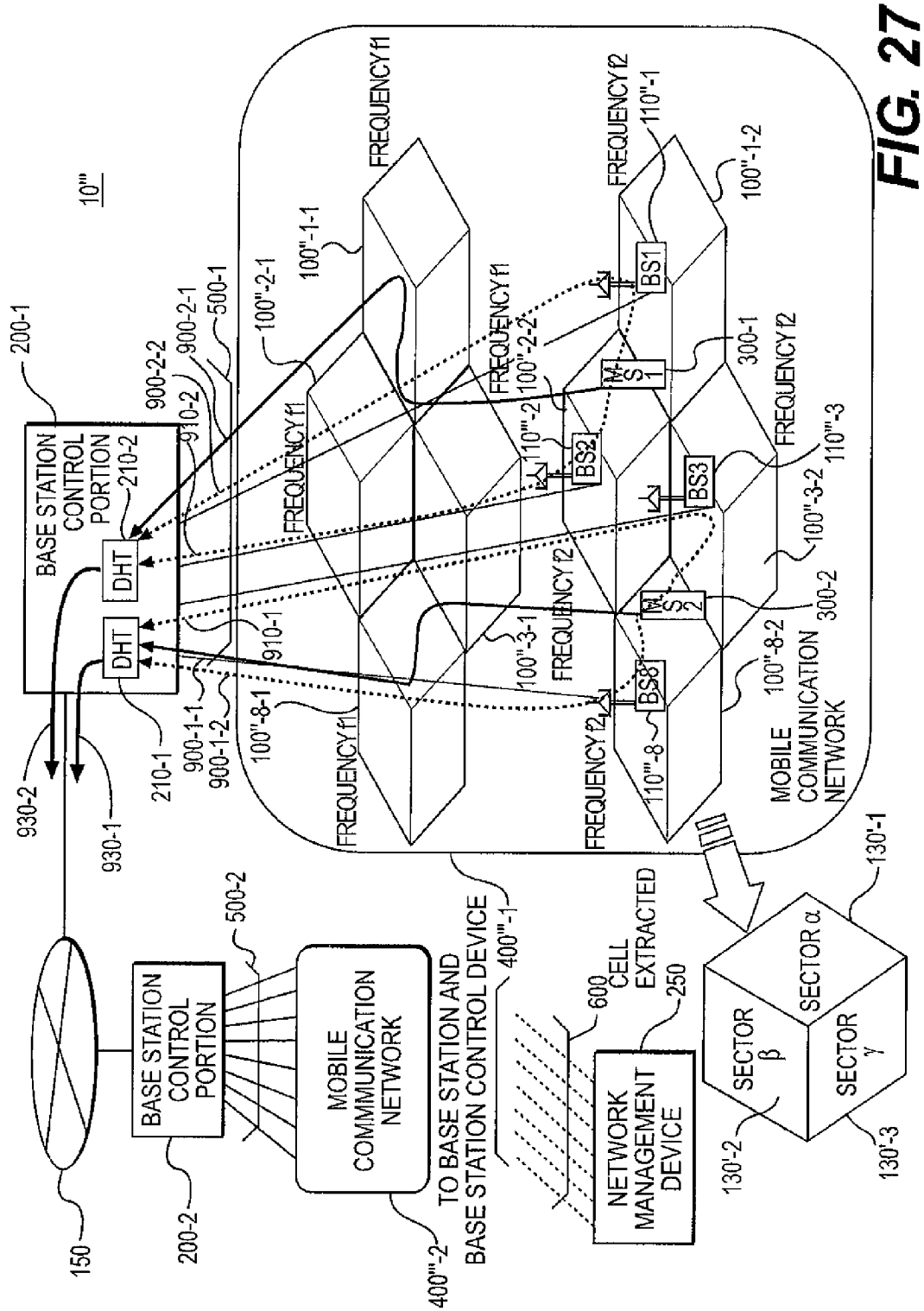
FIG. 27 is a block diagram showing a construction and operational example of a wireless communication network in which one base station has multiple sectors and multiple frequencies.

FIG. 27 is a block diagram showing a construction example of another wireless communication network according to this embodiment. A wireless communication network 10''' has a construction which will be described below and performs communication between/among terminals.

Multiple mobile terminals MS1 300-1 and MS2 300-2 and multiple wireless communication apparatus (called base stations hereinafter) BS1 110'''-1, BS2 110'''-2, BS3 110'''-3 and BS8 110'''-8 are connected through a wireless communication path (not shown). More specifically, each base station BS includes multiple radio coverages called sectors 130'-1 to 130'-3 separately of multiple frequencies and performs wireless communication using the terminal MS and CDMA. In the shown example, communication paths 900-2-1, 900-2-2 and 910-2 can be defined with the sector .beta. of a frequency f1 100"-1-1 and the sector .beta. of a frequency f2 100"-1-2 of the base station BS1 and the sector .alpha. of a frequency f2 100"-2-2 of the base station BS2 through the terminal MS1 300-1. Furthermore, communication paths 900-1-1, 900-1-2 and 910-1 can be defined with the sector .alpha. of a frequency f1 100"-8-1 and the sector .alpha. of a frequency f2 100"-8-2 of the base station BS8 and the sector .beta. of a frequency f2 100"-3-2 of the base station BS3 through the terminal MS2 300-2.

Notably, in the description of this embodiment, an area that these multiple base stations BS1 110'''-1, BS2 110'''-2, BS3 110'''-3 and BS8 110'''-8 can communicate with the terminals MS is called mobile communication network 400'''. The base station 110''' can have any number of frequencies, not limiting to the number shown in FIG. 27. Frequencies of the base station 110''' may have different frequency bands from each other. For example, the frequency f1 and frequency f2 may have a band of 800 MHz and a band of 2 GHz, respectively.

The base stations BS1 110'''-1, BS2 110'''-2, BS3 110'''-3 and BS8 110'''-8 in the mobile communication network 400'''-1 are connected through a base station control portion (or controller) 200-1 and a communication path 500-1. The base station control portion 200 includes a diversity handover unit (DHT) 210 for performing software handover provided by Section 5.2.1, TR25.832 of 3GPP (refer to Non-Patent Document 1) and performs communication through one communication path having good communication quality selected from multiple communication paths 900 and 910, which will be described in more detail later. In FIG. 27, the communication paths 900-1-1 and 900-2-1 indicated by the solid lines are communication paths selected by the DHT 210 while the communication paths indicated by the broken lines are unselected communication paths.

When the terminal MS1 300-1 calls a terminal MS in the same mobile communication network 400'''-1, the base station control portion 200-1 communicates with the called terminal MS by returning a signal 930 selected by the DHT 210 to one of the subordinate base stations BS1 110'''-1, BS2 110'''-2, BS3 110'''-3 and BS8 110'''-8. On the other hand, when the terminal MS1 300-1 calls a terminal in another mobile communication network 400'''-2 (the detail construction of which is substantially the same as that of the mobile communication network 400'''-1 and the description of which will be omitted herein), the communication control portion 200-1 exchanges signals with the called terminal MS by using a base station control portion 200-2 and a mobile communication network 400'''-2 through a communication network 150 connecting the base station control portions 200. The communication network 150 may be a public network, a dedicated line network or a private network. The mobile communication network 400'''-2 may be a so-called fixed network including a wired communication network and a terminal fixed therein.

The network management device 250 is connected to a base stations BS 110''' and base station control portions 200 provided in the communication network 10''' through a control signal communication path 600 through which control signals for monitoring, maintenance and so on are exchanged and manages and/or controls the entire facility of the communication network 10''' by upgrading software in the base stations 110''', for example. Notably, any numbers of base station BS 110''', base station control portion 200 and network management device 250 may be provided, not limiting to the numbers shown in FIG. 27.

Figure 28:
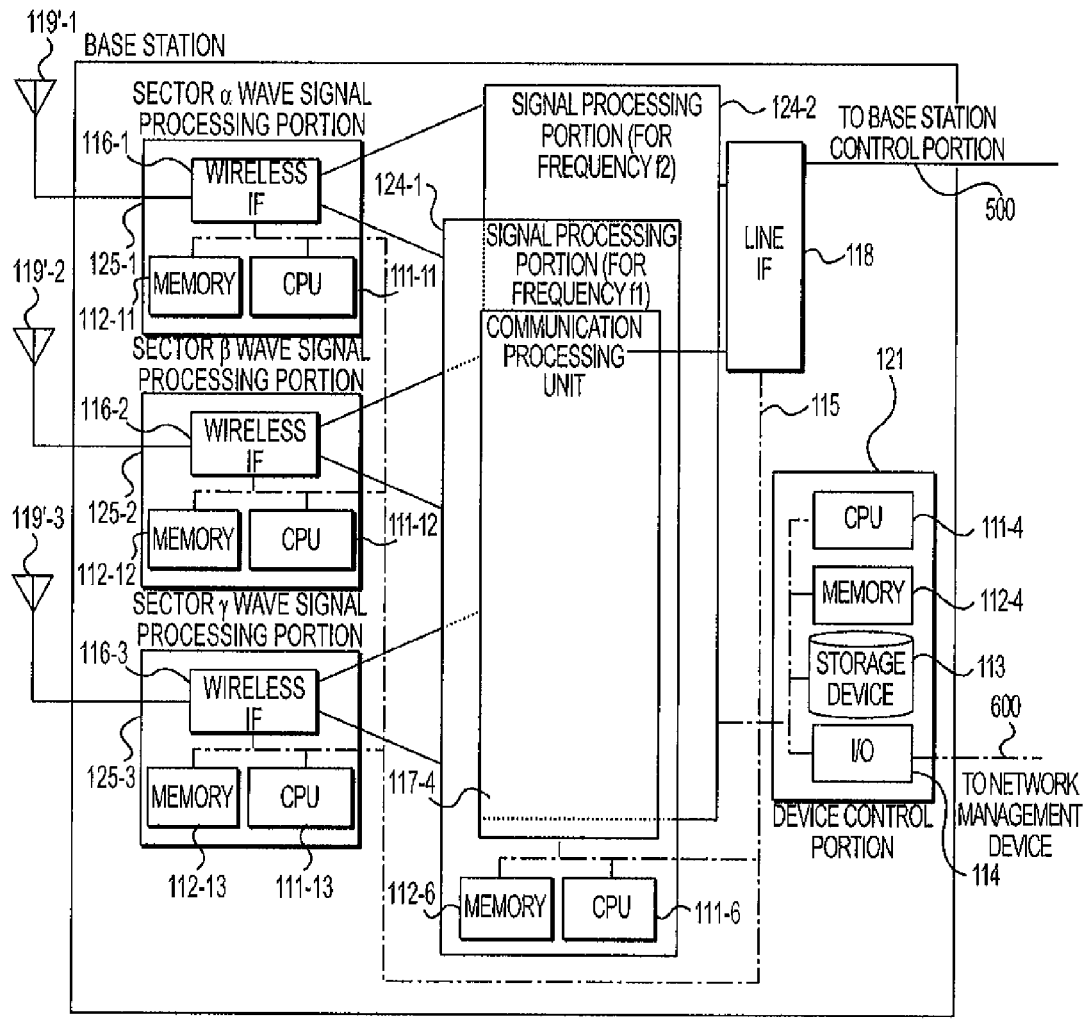
FIG. 28 is a block diagram showing another construction example of a base station having multiple sectors and multiple frequencies.

FIG. 28 is a block diagram showing a construction example of a base station provided in the communication network in FIG. 27. The base station 110''' has a construction which will be described below and connects between the terminal MS 300 and the base station control portion 200 and/or communicates with the network management device 250.

The base station 110''' includes signal processing portions 124-1 and 124-2, one for each frequency, wave signal processing portions 125-1 to 125-3, one for each sector, and a line interface 118, and a device control portion 121.

When the base station 110''' receives a signal (wave signal) transmitted from the terminal MS 300 through a wireless communication path, not shown, by an antenna 119'-1, the wireless IF unit 116-1 of the sector .alpha. wave signal processing portion 125-1 performs end processing such as conversion of the received signal to an electric signal. The communication processing unit (communication processing portion) 117-4 of the signal processing portion (for the frequency f1) 124-1 performs processing (such as processing for communication for call control, for example) for performing a communication service on the signal after the end processing. When the frequency of the received signal is the frequency f2, communication processing is performed by the signal processing portion (for the frequency f2) 124-2. The line IF unit 118 matches the interface with that of the base station control portion 200 and then transmits the signal to the base station control portion 200 through the main signal communication path 500.

The base station 110''' transmits a signal from the base station control portion 200 to the terminal MS 300 in the reverse order of these steps. Though the processing is for the case that a signal at the frequency f1 is exchanged in the sector .alpha., the same is true for the case that a signal (wave signal) at the frequency f1 or frequency f2 is exchanged at the sector .alpha., sector .beta. or sector .gamma. Furthermore, each of the wave signal processing portions 125-1 to 125-3 can reduce and increase outputs of transmission waves for the frequencies f1 and f2, respectively.

A CPU 111-4 of the device control portion 121 of the base station 110''' controls the entire base station 110''' including the sector wave signal processing portions 125-1 to 125-3, signal processing portions 124-1 and 124-2 for frequencies and the line IF 118 by using a control program stored in the memory 112-4 and data required for operating the wireless communication network 10''' (for example, terminal information), which is stored in the storage device 113.

CPUs 111-11 to 111-13 of the sector wave signal processing portion 125-1 to 125-3 of the base station 110''' control the wireless IF units 116-1 to 116-3 for sectors by using a control program stored in memories 112-11 to 112-13 in response to a request from the device control portion 121. A CPU 111-6 (not shown because one for the frequency f2 is identical to the one for the frequency f1) of the signal processing portions 124-1 and 124-2 for the frequencies controls the communication processing units 117-4 (where the one for the frequency f2 is not shown) for the frequencies by using a control program stored in a memory 112-6 (where the one for the frequency f2 is not shown) in response to a request from the device control portion 121.

These units and so on are connected to an internal bus 115. An I/O 114 connecting to the internal bus 115 is an interface with the network management device 250 and exchanges control signals (such as a command) and various kinds of data required for operations, maintenance and so on of the communication network 10''' through a control signal communication path 600. Those control signals and data may be added to a signal to be exchanged through the main signal communication path 500 without the I/O 114 and may be exchanged through the line IF unit 118.

In the base station 110''', with upgrading of a communication service available in the wireless communication network 10''', the CPU 111-4 of the device control portion 121 upgrades software (such as a control program) stored in the device control portion 121, the memories 112-11 to 112-13 of the sector wave signal processing portions 125-1 to 125-3 and the memory 112-6 of the signal processing portion 124-1, for example, for each frequency or firmware (such as a control program) stored in the wireless IF units 116-1 to 116-3, the communication processing unit 117-4 and line IF unit 118 by performing steps and operations, which will be described later, with the base station kept in use (in operation or on line). In the following description of this embodiment, the operation for upgrading software or firmware as described above with the base station kept in use may be called online upgrading. The base station as shown in FIG. 28 has a block for each sector and a block for each frequency, which can be used for both software upgrading for each sector and software upgrading for each frequency.

Figure 29:
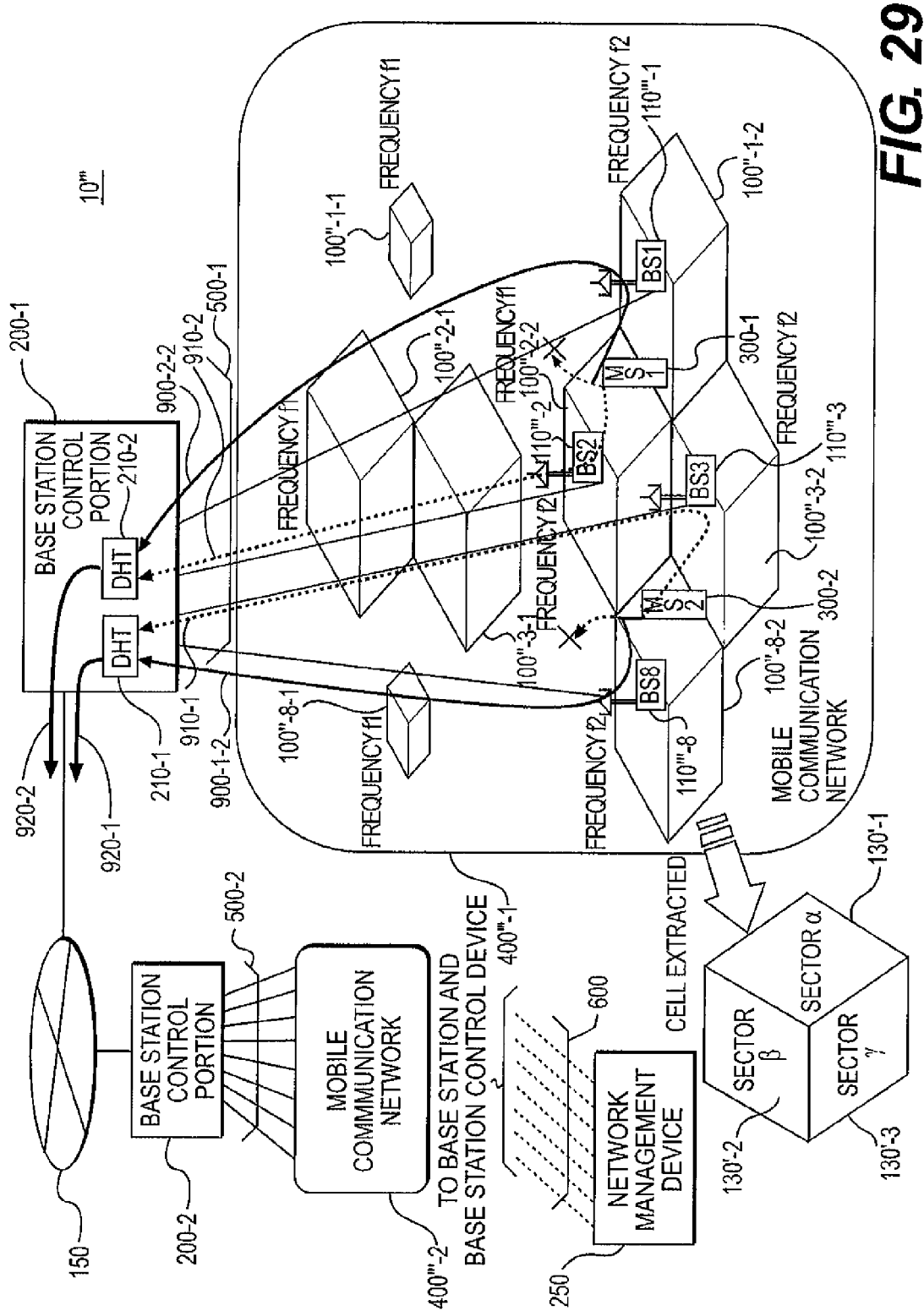
FIG. 29 is a block diagram showing a construction and operational example of a wireless communication network in which one base station has multiple sections and multiple frequencies.

FIG. 29 is a block diagram showing a construction and operational example of the wireless communication network when the transmission waves of the frequency f1 of the base stations BS1 110'''-1 and BS8 110'''-8 are lower than that of FIG. 27. In FIG. 27, the frequency f1 100"-1-1 of the base station BS1 110'''-1 covers the area having the terminal MS1 300-1 while, in FIG. 29, the area covered by the frequency f1 100"-1-1 of the base station BS1 110'''-1 is reduced since the transmission waves of the frequency f1 of the base stations are reduced and the area having the terminal MS1 300-1 cannot be therefore covered. The frequency f1 100"-8-1 of the base station BS8 110'''-8 cannot cover the area having the terminal MS2 300-2 either. Thus, the terminal MS1 300-1 cannot define the communication path 900-2-1 with the frequency f1 10"-1-1 of the base station BS1 110'''-1 and can only define a communication path with the Sector .beta. of the frequency f2 100"-1-2 of the base station BS1 110'''-1 and the sector .alpha. of the frequency f2 100"-2-2 of the base station BS2 110'''-2. Though the terminal MS1 300-1 selects the communication path 900-2-1 having good communication quality in FIG. 27, the communication path 900-2-1 is switched to the communication path 900-2-2 by the DHT 210-2 in the base station control portion 200-1 in FIG. 29 since the terminal MS1 300-1 can no longer define the communication path 900-2-1. The same is true for the terminal MS2, and the communication path 900-1-1 is switched to the communication path 900-1-2. Furthermore, the base station control portion 200-1 communicates with a called terminal by using signals 920-1 and 920-2 from the switched communication path.

The control of transmission waves of a base station can switch the communication path in which a communication service is being provided from a specific frequency of each of the base stations without instantaneous interruption, resulting in a state that no communication service is available at the frequency. Software upgrading is performed in a module provided for each frequency within the base station under the state and processing for returning the transmission waves to the original state is performed sequentially on signal processing portions 124-1 and 124-2 for multiple frequencies (f1 and f2) and base stations after the software upgrading so that software in the module (that is, the signal processing portion 124 in the case in FIG. 28) provided for each frequency in a base station within the wireless communication network can be upgraded without blackouts of the communication services.

Figure 30:
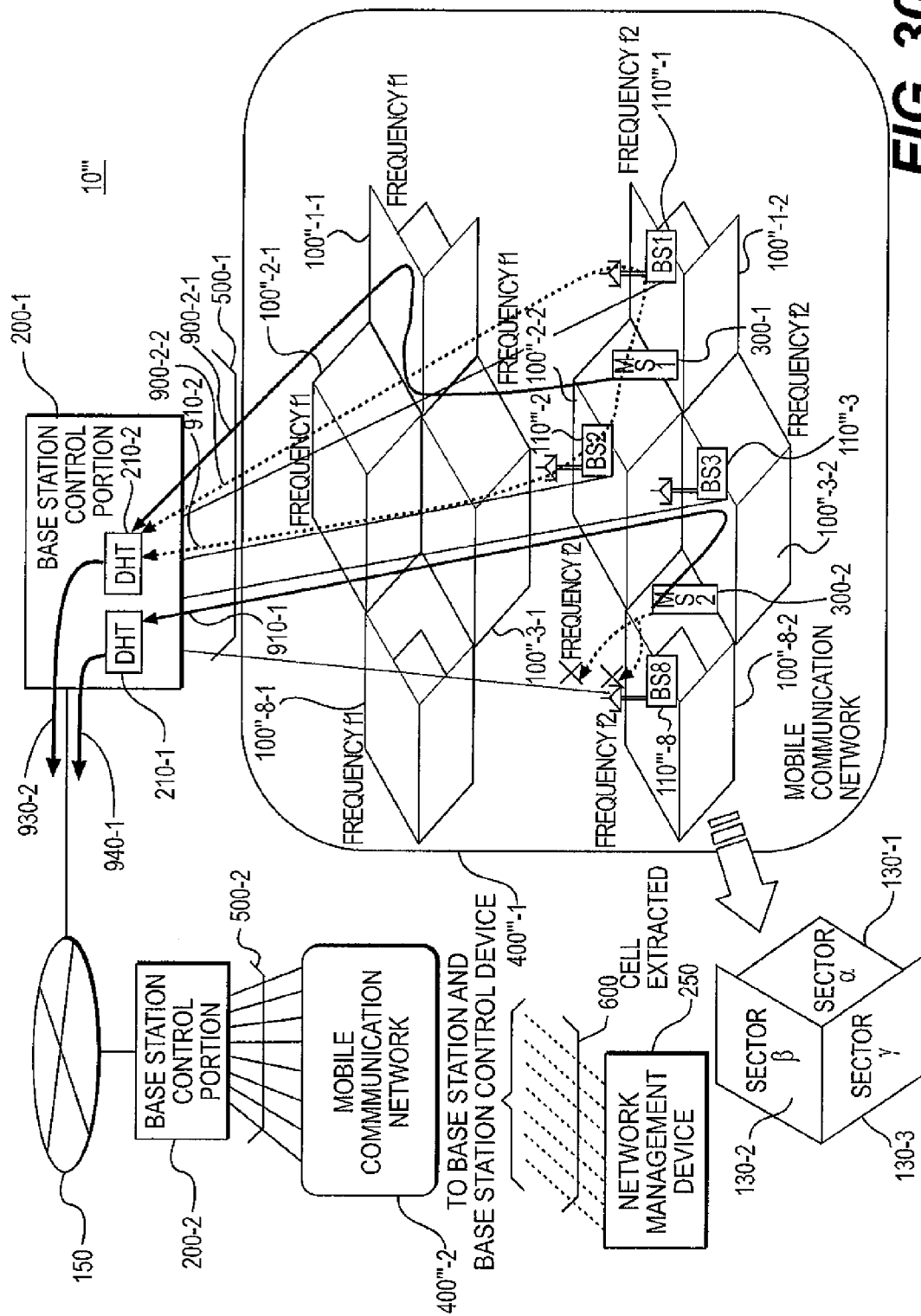
FIG. 30 is a block diagram showing a construction and operational example of a wireless communication network in which one base station has multiple sectors and multiple frequencies.

FIG. 30 is a block diagram showing a construction and operational example of the wireless communication network when the transmission wave output of the sector .alpha. wave signal processing portion 125-1 of the base stations BS1 110'''-1 and BS8 110'''-8 is lower than that of FIG. 27 for all frequencies. In FIG. 27, the sector .alpha. of the base station BS8 110'''-8 covers the area having the terminal MS2 300-2 while, in FIG. 30, the area covered by the sector .alpha. of the base station BS8 110'''-8 is reduced since the transmission wave output of sectors a of the base stations for all frequencies is reduced and the area having the terminal MS2 300-2 cannot be therefore covered. Thus, the terminal MS2 300-2 cannot define the communication paths 900-1-1 and 900-2-1 with all frequencies of the sector .alpha. of the base station BS8 110'''-8 and can only define a communication path 910-1 with the sector .beta. of the base station BS3 110'''-3.

Though the terminal MS2 300-2 selects the communication path 900-1-1 having good communication quality in FIG. 27, the communication path 900-1-1 is switched to the communication path 910-1 by the DHT 210-2 in the base station control portion 200-1 in FIG. 30 since the terminal MS2 300-2 can no longer define the communication path 900-1-1.

The base station control portion 200-1 communicates with a called terminal by using a signal 940-1 from the switched communication path.

The control of transmission waves of a base station can switch the communication path in which a communication service is being provided from a specific sector of each of the base stations without instantaneous interruption, resulting in a state that no communication service is available at the frequency in the sector. Software upgrading is performed under the state and processing for returning the transmission waves to the original state is performed sequentially on wave signal processing portions 125-1 to 125-3 for multiple sectors (.alpha., .beta. and .gamma.) and base stations after the software upgrading so that software in a module (that is, the sector wave signal processing portion 125 in the case in FIG. 28) provided for each sector in a base station within the wireless communication network can be upgraded without blackouts of the communication services.

Software in a base station having the construction in FIG. 28 may be upgraded without blackouts of the communication service by using a combination of systems in FIGS. 29 and 30.

Figure 31:
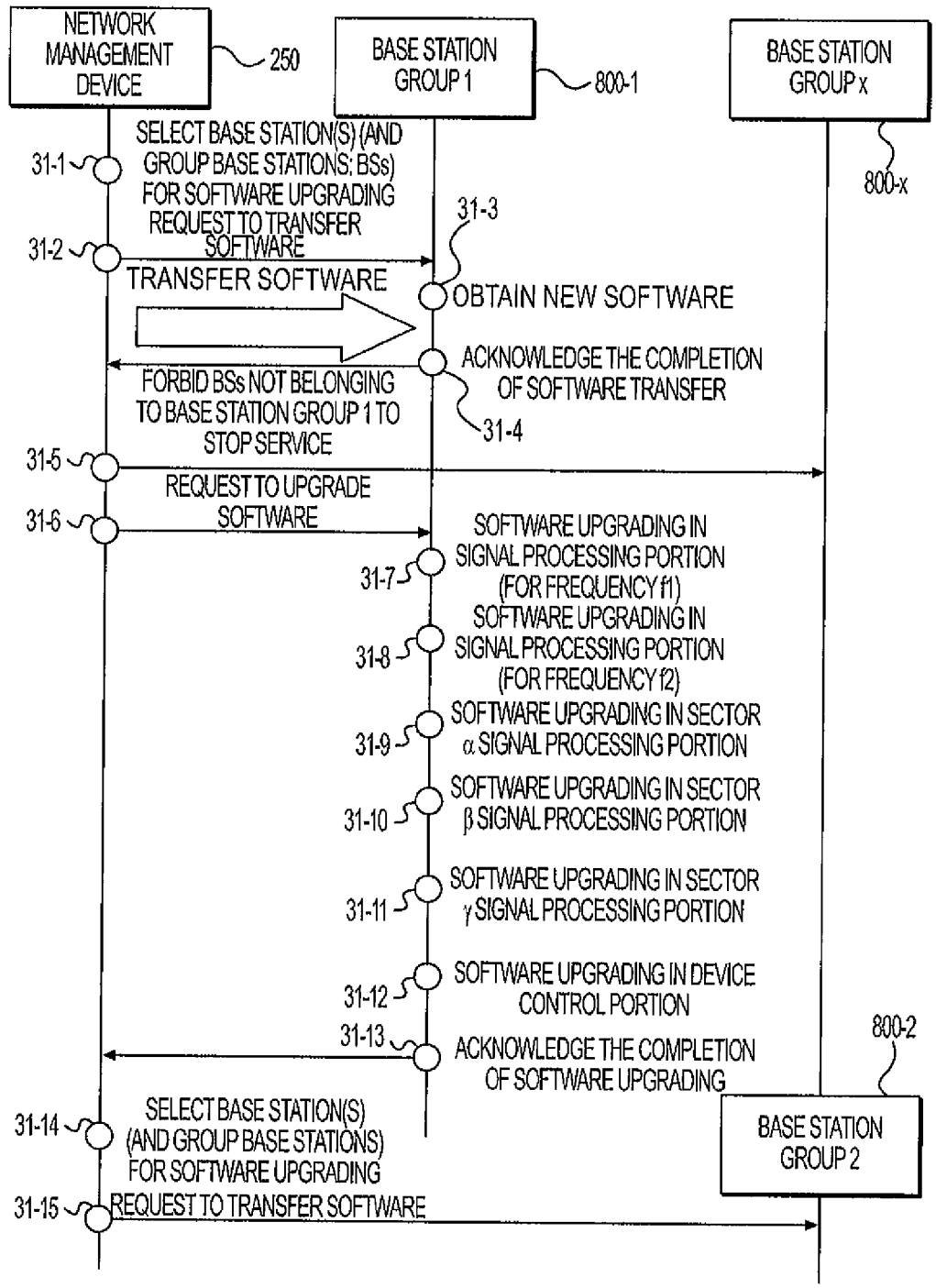
FIG. 31 is an operational explanatory diagram illustrating an example of an operation for upgrading software in abase station.

FIG. 31 is an operational explanatory diagram for describing an example of a software upgrading operation in a base station. The network management device 250 performs a step 31-1 of selecting (and grouping) base stations having software to upgrade under a predetermined rule. A group of base stations selected in the step 31-1 is called base station group 1 (800-1), hereinafter. The selection of base stations can be implemented by using the method described with reference to FIGS. 7 to 12, for example. The number of call connections (or number of calls) is managed for each sector and each frequency, and the number of call connections of a base station may be the sum value thereof.

When the network management device 250 performs a step 31-2 of requesting the base station group 1 (800-1) to transfer software, base stations belonging to the base station group 1 (800-1) perform a step 31-3 of obtaining new software and obtain new software, for example, thereby and perform a step 31-4 of acknowledging the completion of the software transfer to the network management device 250. The network management device 250 performs a step 31-5 of forbidding a base station 800-x not belonging to the base station group 1 (800-1) to perform a service stop operation and performs a step 31-6 of requesting the base station group 1 (800-1) to upgrade software. The step 31-5 may be omitted.

In response to the request, base stations belonging to the base station group 1 (800-1) sequentially perform a step 31-7 of upgrading software in the signal processing portion (for the frequency f1) and a step 31-8 of upgrading software in the signal processing portion (for the frequency f2), a step 31-9 of upgrading software in the sector .alpha. wave signal processing portion, a step 31-10 of upgrading software by the sector .beta. wave signal processing portion and a step 31-11 of upgrading software in the sector .gamma. wave signal processing portion, a step 31-12 of upgrading software in the device control portion 121 and then a step 31-13 of acknowledging the completion of the software upgrading to the network management device. The order of the steps 31-7 to 31-12 of software upgrading is an example, and the steps 31-7 to 31-12 can be performed in any order. For example, one of predetermined multiple frequencies may be sequentially selected, and software upgrading may be performed sequentially on signal processing portions in accordance with selected frequencies. Alternatively, sectors may be sequentially selected in the same manner, and software upgrading may be performed sequentially on wave signal processing portions in accordance with the selected sectors.

Figure 32:
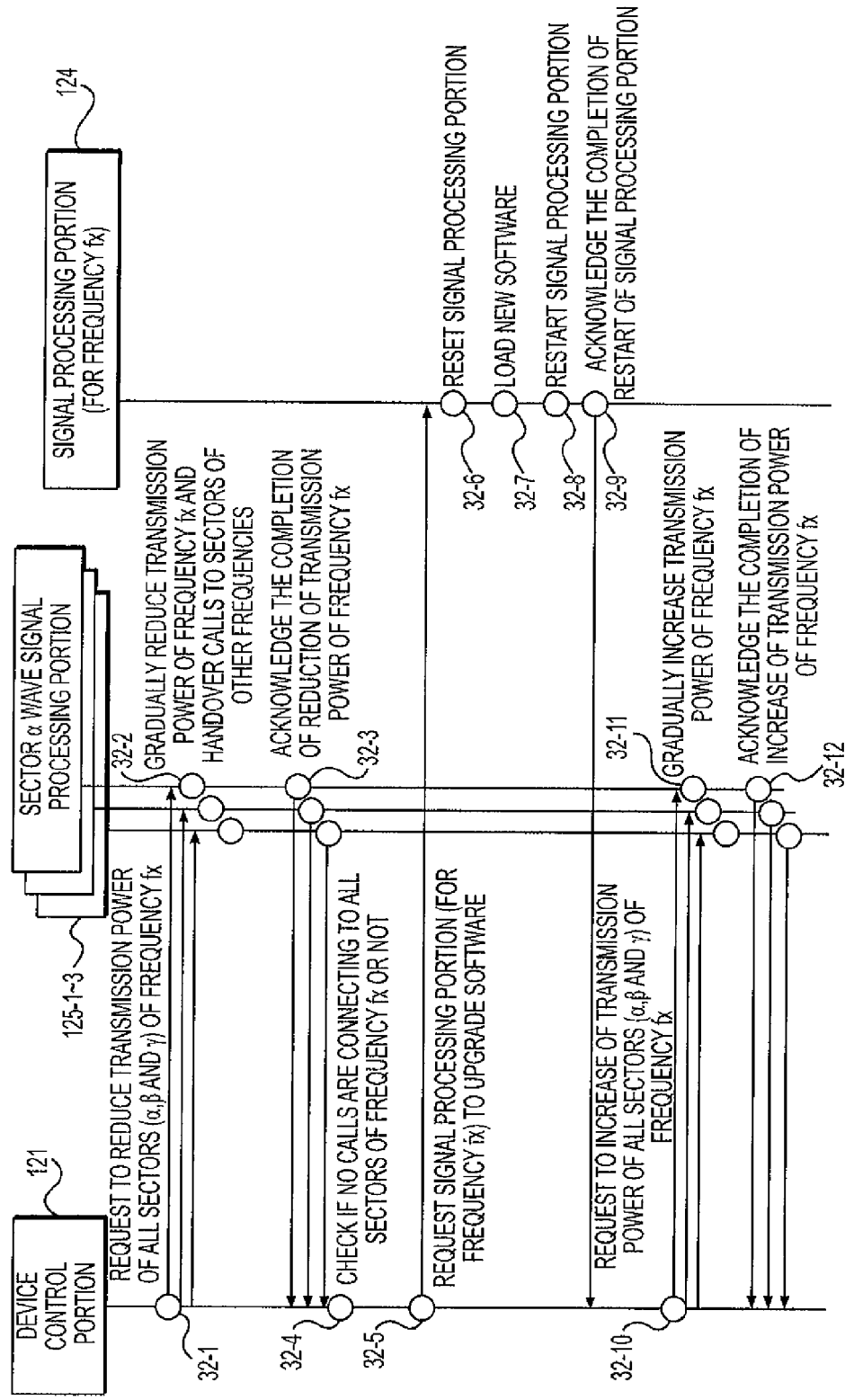
FIG. 32 is an operational explanatory diagram showing a partial detail of an operational example of a base station having software to upgrade.
Figure 33:
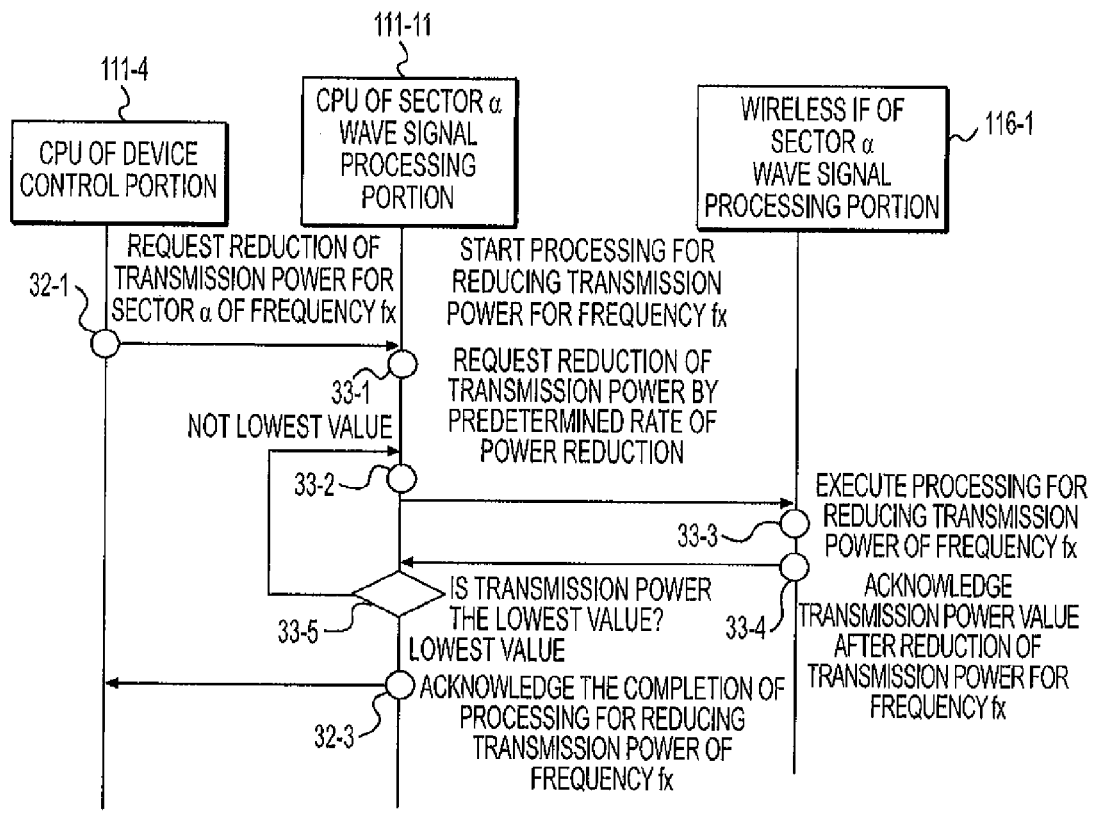
FIG. 33 is an operational explanatory diagram showing an operational example of a sector wave signal processing portion within a base station having software to upgrade.
Figure 34:
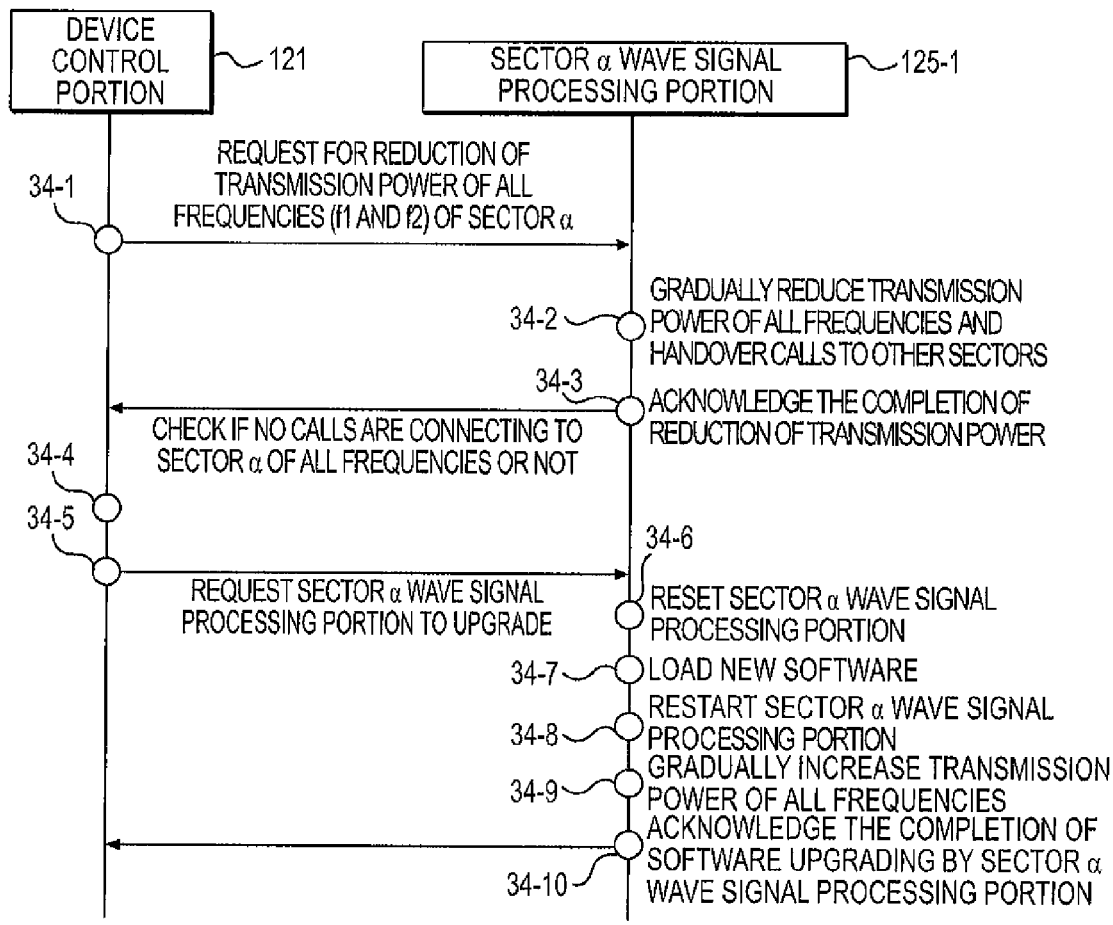
FIG. 34 is an operational explanatory diagram showing partial details of an operational example of a base station having software to upgrade.
Figure 35:
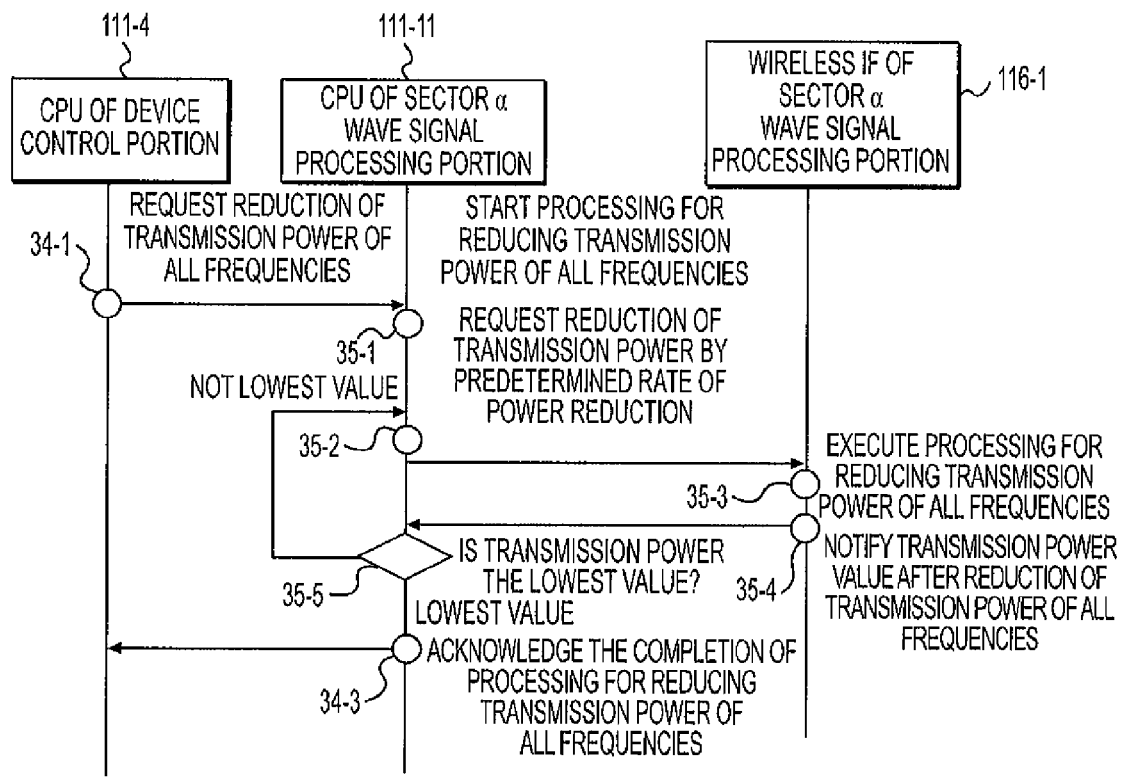
FIG. 35 is an operational explanatory diagram showing an operational example of a sector wave signal processing portion within a base station having software to upgrade.

The detail steps and further detail steps of the software upgrading processing (in the steps 31-7 and 31-8) in the frequency signal processing portions 124-1 and 124-2 are shown in FIGS. 32 and 33, respectively. The detail steps and further detail steps of the software upgrading processing (in the steps 31-9 to 31-11) in the sector wave signal processing portions 125-1 to 125-3 are shown in FIGS. 34 and 35, respectively. The detail steps of the software upgrading processing (in the step 31-12) in the device control portion 121 is the same as the processing shown in FIG. 20.

In response to the acknowledgement of the completion of software upgrading from all base stations belonging to the base station group 1 (800-1), the network management device 250 performs a step 31-14 of newly selecting (and grouping) base stations having software to upgrade. The selection of base stations can be performed in the same manner as the one described with reference to FIGS. 7 to 12. A group of the selected base stations is called base station group 2 (800-2), hereinafter. The network management device 250 performs a step 31-15 of requesting the base station group 2 (800-2) to transfer software. The step 31-15 is identical to the step 31-2. The network management device 250 also performs the same processing on the base station group 2 (800-2) as the processing (in the steps 31-2 to 31-13), which is performed on the base station group 1 (800-1). Software in all base stations can be upgraded by repeating these steps until base stations not belonging to any base station group no longer remain. Notably, the selection of a base station group may be omitted.

FIG. 32 is an operational flow diagram for describing the detail steps of software upgrading processing (in the steps 31-7 and 31-8) in the signal processing portions. First of all, the device control portion 121 performs a step 32-1 of requesting the sector wave signal processing portions 125-1 to 125-3 to reduce transmission power of the frequency fx of all sectors. The sector wave signal processing portions 125-1 to 125-3 perform a step 32-2 of gradually reducing the transmission power of the frequency fx (f1 or f2) of all sectors. Thus, the area covered by the frequency fx is reduced to the area covered by the frequency f1 of the base stations BS1 110'''-1 and BS8 110'''-8 shown in FIG. 29, and a call covered by the frequency fx is handed over to another frequency (that is, the frequency f2 in FIG. 29). Then, the communication service for the call is continued. Upon completion of the processing for reducing transmission power of the frequency fx, the sector wave signal processing portions 125-1 to 125-3 of the sectors perform a step 32-3 of acknowledging the completion to the device control portion 121.

The device control portion 121 performs a step 32-4 of checking if no calls are connecting to all sectors of the frequency fx or not and then performs a step 32-5 of requesting the signal processing portion 124-x (for the frequency fx) to upgrade software in the signal processing portion (for the frequency fx) 124-x.

The signal processing portion (for the frequency fx) 124-x performs a step 32-6 of resetting the signal processing portion (for the frequency fx) 124-x itself in response to the request for software upgrading and thereby performs a step 32-7 of loading new software. Then, after the completion of a restart step 32-8, the completion of the restart of the signal processing portion (for the frequency fx) is acknowledged to the device control portion 121 (step 32-9). Here, the software to be loaded may be the software obtained in the step 31-3, for example. In response to the acknowledgement of the restart step 32-9 from the signal processing portion (for the frequency fx) 124-x, the device control portion 121 performs a step 32-10 of requesting to increase all sector transmission power of the frequency fx in the sector wave signal processing portions 125-1 to 125-3. The sector wave signal processing portions 125 performs a step 32-11 of gradually increasing transmission power in response to the request to increase transmission power of the frequency fx. Thus, communication processing of all sectors of the frequency fx (such as f1) is enabled again.

Upon completion of the step 32-11 of gradually increasing transmission power, the sector wave signal processing portions 125-1 to 125-3 perform a step 32-12 of acknowledging the completion of the increase of the transmission power of the frequency fx to the device control portion 121. In order to allow the handover of a call to each sector of another frequency, the steps in FIG. 32 may be sequentially performed for each frequency like the software upgrading processing (in the steps 31-7 and 31-8) in the signal processing portions 124 in FIG. 31, for example, without performing the steps on the signal processing portions 124 at the same time. For example, in the step 31-7 in FIG. 31, the steps in FIG. 32 may be performed with fx=f1, and, in the step 31-8 in FIG. 31, the steps in FIG. 32 may be performed with fx=f2.

FIG. 33 is an operational flow diagram for describing details of the step 32-2 of gradually reducing transmission power of the frequency fx shown in FIG. 32. Notably, though FIG. 33 shows the sector .alpha., the same is true for the sectors .beta. and .gamma. In response to the request to reduce transmission power of the frequency fx from the CPU 111-4 of the device control portion (32-1), the CPU 111-11 of the sector .alpha. wave signal processing portion 125-1 starts a step 33-1 of reducing transmission power of the frequency fx. The CPU 111-11 performs a step 33-2 of requesting the wireless IF 116-1 to reduce transmission power of the frequency fx by a predetermined rate of power reduction. The wireless IF 116-1 performs a step 33-3 of reducing transmission power in response thereto and performs a step 33-4 of notifying a transmission power value after the reduction of transmission power to the CPU 111-11.

The CPU 111-11 performs a step 33-5 of determining whether the power value notified by the wireless IF 116-1 is the lowest value of the transmission power or not and, if not, performs the step 33-2 again. If the notified power value reaches the lowest value, a step 32-3 of ending the reduction of transmission power is performed. For example, the CPU 111-11 acknowledges the completion of the processing for reducing the transmission power of the frequency fx to the CPU 111-4 of the device control portion.

The processing allows a base station to gradually reduce transmission power of the frequency fx of all sectors within the base station and allows to switch a communication path in which a communication service is being provided in the base station to one at another frequency, resulting in a state that no communication service is available at the frequency fx of all sectors within the base station. Thus, software can be upgraded in a module relating to the frequency fx, that is, the signal processing portion (for the frequency fx).

FIG. 34 is an operational flow diagram for describing detail steps of the software upgrading step 31-9 in the sector .alpha. wave signal processing portion. The same is true for the steps 31-10 and 31-11 in the sectors .beta. and .gamma. First of all, the device control portion 121, performs a step 34-1 of requesting the sector .alpha. wave signal processing portion 125-1 to reduce transmission power of all frequencies. The sector .alpha. wave signal processing portions 125-1 performs a step 34-2 of gradually reducing the transmission power of all frequencies of the sector .alpha. Thus, the area covered by all frequencies in the sector .alpha. is reduced to the area covered by the sector .alpha. of the base stations BS1 110'''-1 and BS8 110'''-8 shown in FIG. 30, and calls covered by all frequencies in the sector a are handed over to another sector (that is, the sector .beta. of the base station BS3 110'''-3 in the terminal MS2 300-2 in FIG. 30). Then, the communication services for the calls are continued. Upon completion of the processing for reducing transmission power of all frequencies in the sector .alpha., the sector .alpha. wave signal processing portion 125-1 performs a step 34-3 of acknowledging the completion to the device control portion 121.

The device control portion 121 performs a step 34-4 of checking if no calls are connecting to the sector .alpha. of all frequencies or not and then performs a step 34-5 of requesting the sector .alpha.wave signal processing portion 125-1 to upgrade software in the sector .alpha. wave signal processing portion 125-1. The sector .alpha. wave signal processing portion 125-1 performs a step 34-6 of resetting the sector .alpha. wave signal processing portion 125-1 itself in response to the request for software upgrading and thereby performs a step 34-7 of loading new software. Then, after the completion of a restart step 34-8, a step 34-9 of gradually increasing transmission power of all frequencies is performed. Here, the software to be loaded may be the software obtained in the step 31-3, for example. Thus, communication processing for all frequencies of the sector .alpha. is enabled again.

Upon completion of the step 34-9 of gradually increasing transmission power, the sector .alpha. wave signal processing portion 125-1 performs a step 34-10 of acknowledging the completion of software upgrading in the sector .alpha. wave signal processing portion to the device control portion 121. In order to allow the handover of calls to another sector, the steps in FIG. 34 may be sequentially performed like the software upgrading processing (in the steps 31-9 to 31-11) in the sector wave signal processing portions 125 in FIG. 31, for example, without performing the processing on the sector wave signal processing portions 125 at the same time.

FIG. 35 is an operational flow diagram for describing details of the step 34-2 of gradually reducing transmission power of all frequencies of the sector .alpha. shown in FIG. 34. Notably, though FIG. 35 shows the sector .alpha., the same is true for the sectors .beta. and .gamma. In response to the request to reduce transmission power of all frequencies from the CPU 111-4 of the device control portion (step 34-1), the CPU 111-11 of the sector .alpha. wave signal processing portion 125-1 starts a step 35-1 of reducing transmission power of all frequencies.

The CPU 111-11 performs a step 35-2 of requesting the wireless IF 116-1 of the wave signal processing portion to reduce transmission power by a predetermined rate of power reduction. The wireless IF 116-1 performs a step 35-3 of reducing transmission power of all frequencies in response thereto and performs a step 35-4 of notifying a transmission power value after the reduction of transmission power of all frequencies to the CPU 111-11.

The CPU 111-11 performs a step 35-5 of determining whether the power value notified by the wireless IF 116-1 is the lowest value of the transmission power or not and, if not, performs the step 35-2 again. If the notified power value reaches the lowest value, the step 34-3 of ending the reduction of transmission power is performed. For example, the CPU 111-11 acknowledges the completion of the processing for reducing the transmission power of all frequencies to the CPU 111-4 of the device control portion.

The processing allows a base station to gradually reduce transmission power of all frequencies of one sector within the base station and allows to switch a communication path in which a communication service is being provided in the base station to one in another sector or an adjacent base station, resulting in a state that no communication service is available in the sector within the base station. Thus, software can be upgraded in a module relating to the sector, that is, the sector wave signal processing portion.

The invention is applicable to industries relating to wireless communication apparatus, wireless communication networks and software upgrading.

What is claimed is:

1. A base station apparatus having a plurality of sectors and communicating with a wireless terminal in the sectors and a wired communication network by using a plurality of wireless communication paths having different frequencies, the base station apparatus comprises:
    an apparatus management portion that manages the entire base station apparatus based on control signals from a network management device in the wired communication network; and
    a plurality of wave signal processing portions for each of the plurality of frequencies,
    wherein each of the wave signal processing portions comprises:
    a plurality of antennas for each of the plurality of sectors;
    a plurality of sector processing portions for each of the plurality of sectors; and
    a sector control portion that controls the plurality of sector processing portions,
    wherein the sector control portion comprises:
    a memory that stores a software for controlling the sector processing portions; and
    a CPU,
    wherein when the apparatus management portion receives an upgrading request to upgrade software from the network management device, at a state in which a new software for upgrading has been transferred from the network management device to the base station apparatus,
    wherein the apparatus management portion does not perform a software upgrading processing for each of the wave signal processing portions at the same time, controls the each of the wave signal processing portions of each frequency such that the wave signal processing portion of one frequency no longer provides the communication services to perform the software upgrading processing and the wave signal processing portion of other frequency provides the communication services and, performs the software upgrading processing for each of the wave signal processing portions sequentially,
    wherein the CPU of the wave signal processing portion, which performs the software upgrading processing in accordance with a control by the apparatus management portion, requests the sector processing portions of the wave signal processing portion to reduce a transmission power of the sector processing portions by a predetermined rate of the power reduction,
    wherein the sector processing portions reduce the transmission power in response to the request and, notify the CPU of the transmission power value after the transmission power reduction, wherein the CPU, in accordance with the notification, determines if the notified transmission power value reaches a predetermined lowest value of the transmission power or not, wherein the CPU, in a case that the transmission power value does not reaches the lowest value, further requests to reduce the transmission power by the predetermined rate of the power reduction, and wherein the CPU, in a case that the transmission power value reaches the lowest value, finishes the reduction of the transmission power, performs a reset processing and a load processing of the new software for upgrading and, performs a processing of gradually increasing the transmission power, thereby performs the software upgrading processing.

2. A base station apparatus according to claim 1, wherein a state that the communication services are no longer provided at the frequency is achieved by reducing the transmission power to the lowest value.

* * * * *

UNITED STATES PATENT AND TRADEMARK OFFICE
CERTIFICATE OF CORRECTION

| | | |
|---|---|---|
| PATENT NO. | : 7,937,078 B2 | Page 1 of 1 |
| APPLICATION NO. | : 12/271071 | |
| DATED | : May 3, 2011 | |
| INVENTOR(S) | : Koichi Okita et al. | |

It is certified that error appears in the above-identified patent and that said Letters Patent is hereby corrected as shown below:

Title page, Item 30 should read:

-- (30)    Foreign Application Priority Data
Apr. 22, 2003    (JP) ..................... 2003-117281
Jun. 3, 2003    (JP) ..................... 2003-157584
Sep. 6, 2004    (JP) ..................... 2004-258554 --

Col. 1, Delete lines 8-20 and insert the following:

-- CROSS-REFERENCES TO RELATED APPLICATIONS
[0001]    The present application is a continuation of application Serial No. 11/798,517, filed May 15, 2007; which is a continuation of application Serial No. 11/037,283, filed January 19, 2005, now U.S. Patent No. 7,310,519; which is a continuation-in-part application of U.S. Application Serial No. 10/636,806, filed August 8, 2003, now U.S. Patent No. 7,447,497, the subject matter of which is incorporated by reference herein. Applicants hereby claim the right of priority based on Japanese Patent Application No. 2004-258554, filed in Japan on September 6, 2004 and in Japanese Patent Application Nos. 2003-117281, filed in Japan on ~~April 21, 2003~~April 22, 2003 and 2003-157584, filed in Japan on June 3, 2003, the subject matter of which is also incorporated by reference herein. --

Signed and Sealed this
Twenty-fourth Day of July, 2012

David J. Kappos
*Director of the United States Patent and Trademark Office*